US 9,823,665 B2

(12) United States Patent
Finnell et al.

(10) Patent No.: US 9,823,665 B2
(45) Date of Patent: Nov. 21, 2017

(54) CROSS CONTAMINATION CONTROL SYSTEMS WITH FLUID PRODUCT ID SENSORS

(71) Applicant: Delaware Capital Formation, Inc., Wilmington, DE (US)

(72) Inventors: Scott A. Finnell, Parkville, MO (US); Steven D. Gramling, Olathe, KS (US); Mark William Dudley, Smithville, MO (US); Claude W. Mixon, Billings, MO (US); Francis V. Stemporzewski, Jr., Salem, NH (US)

(73) Assignee: Knappco Corporation, Riverside, MO (US)

( * ) Notice: Subject to any disclaimer, the term of this patent is extended or adjusted under 35 U.S.C. 154(b) by 868 days.

(21) Appl. No.: 14/075,336

(22) Filed: Nov. 8, 2013

(65) Prior Publication Data

US 2014/0129038 A1  May 8, 2014

Related U.S. Application Data

(60) Provisional application No. 61/723,948, filed on Nov. 8, 2012.

(51) Int. Cl.
*G05D 7/00* (2006.01)
*G05D 11/00* (2006.01)
(Continued)

(52) U.S. Cl.
CPC ............ *G05D 7/0629* (2013.01); *B67D 7/32* (2013.01); *B67D 7/342* (2013.01); *B67D 7/344* (2013.01);
(Continued)

(58) Field of Classification Search
None
See application file for complete search history.

(56) References Cited

U.S. PATENT DOCUMENTS

| 4,469,149 A | 9/1984 | Walkey et al. |
| 4,838,323 A | 6/1989 | Watts |

(Continued)

FOREIGN PATENT DOCUMENTS

| AU | 2007200878 A1 | 9/2007 |
| EP | 0568837 A2 | 4/1993 |

(Continued)

OTHER PUBLICATIONS

International Preliminary Report on Patentability relating to PCT/US2013/069203 filed Nov. 8, 2013; dated May 21, 2015.

(Continued)

*Primary Examiner* — Mohammad Ali
*Assistant Examiner* — Md Abul Azad
(74) *Attorney, Agent, or Firm* — Dinsmore & Shohl LLP

(57) ABSTRACT

A crossover protection system including a product transport vehicle having a tank compartment for containing a liquid product, a fluid property sensor positioned to contact liquid product stored in the tank compartment, a system controller, and a valve coupled to the tank compartment. The valve regulates a flow of liquid product from the tank compartment and has a normally locked state. The system controller may compare a received transported liquid type signal from the fuel property sensor indicative of the type of liquid product in the tank compartment and compare the type of liquid product to a stored liquid product type. If the two types match, the crossover protection controller transitions the valve to an unlocked state to allow the liquid product to unload from the tank compartment. If the two types do not (Continued)

match, the crossover protection controller will disable the valve from transitioning to the unlocked state.

57 Claims, 8 Drawing Sheets

(51) Int. Cl.

| | |
|---|---|
| G01R 29/26 | (2006.01) |
| G01N 11/00 | (2006.01) |
| G01L 7/00 | (2006.01) |
| G01F 23/00 | (2006.01) |
| G05D 7/06 | (2006.01) |
| B67D 7/32 | (2010.01) |
| B67D 7/34 | (2010.01) |
| B67D 7/04 | (2010.01) |

(52) U.S. Cl.
CPC ...... *B67D 7/348* (2013.01); *B67D 2007/0428* (2013.01); *B67D 2007/0446* (2013.01); *B67D 2007/0453* (2013.01)

(56) References Cited

U.S. PATENT DOCUMENTS

| | | | |
|---|---|---|---|
| 5,209,275 A | 5/1993 | Akiba et al. | |
| 5,309,957 A | 5/1994 | Saisuu | |
| 5,349,994 A | 9/1994 | Koeninger | |
| 5,460,210 A | 10/1995 | Koeninger | |
| 5,507,326 A | 4/1996 | Cadman et al. | |
| 5,515,890 A | 5/1996 | Koeninger | |
| 5,604,681 A | 2/1997 | Koeninger | |
| 5,605,182 A | 2/1997 | Oberrecht et al. | |
| 5,654,497 A | 8/1997 | Hoffheins et al. | |
| 5,655,577 A | 8/1997 | Loen et al. | |
| 5,722,469 A | 3/1998 | Tuminaro | |
| 6,244,287 B1 | 6/2001 | Hill et al. | |
| 6,341,629 B1 | 1/2002 | Clark et al. | |
| 6,347,723 B1 | 2/2002 | Barlian et al. | |
| 6,394,150 B1 | 5/2002 | Haimovich et al. | |
| 6,616,036 B2 | 9/2003 | Streicher et al. | |
| 6,622,758 B2 | 9/2003 | Drube et al. | |
| 6,649,829 B2 | 11/2003 | Garber et al. | |
| 6,897,374 B2 | 5/2005 | Garber et al. | |
| 7,012,536 B2 | 3/2006 | McConnel et al. | |
| 7,188,771 B2 | 3/2007 | Poulter | |
| 7,628,182 B2 | 12/2009 | Poulter et al. | |
| 7,647,954 B2 | 1/2010 | Garber et al. | |
| 8,261,784 B2 | 9/2012 | Gerard et al. | |
| 8,593,290 B2 | 11/2013 | Hunter et al. | |
| 2007/0198186 A1* | 8/2007 | Realini | B67D 7/348 701/469 |
| 2011/0040503 A1* | 2/2011 | Rogers | B67D 7/222 702/55 |
| 2011/0120589 A1 | 5/2011 | Evans | |
| 2012/0158192 A1* | 6/2012 | Sherwood | G01C 21/3492 700/282 |
| 2014/0316589 A1* | 10/2014 | Lichtash | B67D 7/346 700/282 |

FOREIGN PATENT DOCUMENTS

| | | |
|---|---|---|
| EP | 0805121 B1 | 5/1997 |
| EP | 1354847 A1 | 10/2003 |
| EP | 1832548 A1 | 9/2007 |
| EP | 1354847 B1 | 7/2008 |
| EP | 2234042 A1 | 9/2010 |
| FR | 2878516 | 11/2004 |
| FR | 2878516 A1 | 6/2006 |
| GB | 2293658 B | 9/1995 |
| GB | 2416756 B | 11/2008 |
| JP | S59102629 | 12/1982 |
| JP | S6025224 | 5/1984 |
| JP | S59102629 A | 6/1984 |
| JP | S60252244 A | 12/1985 |
| JP | H7315497 | 5/1994 |
| JP | H07315497 A | 12/1995 |

OTHER PUBLICATIONS

Alfons Haar, SPDS—Sealed Parcel Delivery System, "Automatic recognition of tampering: No additional analysis of report data in the office"; [online]. Retrieved from the Internet: www.alfons-haar.de.; (2 pages).

Alfons Haar, PreciCONTROL—Application COP, SPDS, DTMQ, MID, FTL, "Automation in tank truck construction: Minimizes costs, weight, installation and maintenance"; [online]. Retrieved from the Internet: www.alfons-haar.de.; (2 pages).

Liquip International, Downstream News, Issue 4, Apr. 2007; (10 pages).

Civacon, The Smartlok System, "The economical reliable way to strengthen the weak link in your blending process control", 1994; (4 pages).

Civacon, "Strengthen the weak link in your blending process control", 1994; (2 pages).

Civacon, The Smartlok System, "Coupling verification system by Civacon", Jan. 1995; (9 pages).

Measurement Specialties, "Preliminary Specification—FPS2800B12C4—Fluid Property Sensor Module", [online]. Retrieved from www.meas-spec.com; Dec. 2009; (pp. 1-5).

Sening NoMix, "Cross-Over Prevention", FMC Technologies Measurement Solutions, Inc., Apr. 2009; (4 pages).

Civacon, "Say goodbye to cross contamination: The Civaflo manifold system"; (4 pages).

Communication relating to the results of the Partial International Search dated Jan. 22, 2014, for International Patent Application No. PCT/US2013/069203 filed Nov. 8, 2013.

International Search Report pertaining to Application No. PCT/US2013/069203 filed Nov. 8, 2013 (9 pp.).

Written Opinion pertaining to Application No. PCT/US2013/069203 filed Nov. 8, 2013 (17 pp.).

\* cited by examiner

CROSS CONTAMINATION CONTROL SYSTEMS WITH FLUID PRODUCT ID SENSORS

CROSS REFERENCE TO RELATED APPLICATIONS

The present application hereby claims priority under 35 U.S.C. §119(e) to Provisional U.S. Application No. 61/723,948 filed Nov. 8, 2012, titled "Cross Contamination Control System," which is herein incorporated by reference in its entirety.

BACKGROUND

There are many different types of fuel products available for a consumer to use. Many of those products are available at retail distribution stations where they are individually stored in several large distribution tanks such that the different fuel products are segregated from each other. Conventionally, the process of loading and unloading the fuel products to and from the distribution tanks relies on an operator to ensure that two differing fuel products are not mixed in the tanks. Mistakenly mixing differing fuel products can be a costly mistake.

Accordingly, a need exists for alternative systems for preventing the cross contamination of liquids in storage tanks.

SUMMARY

In one embodiment, a crossover prevention system may include a product transport vehicle having a tank compartment for containing a liquid product, a fluid property sensor positioned to contact liquid product stored in the tank compartment, a system controller, and a valve coupled to the tank compartment. The valve regulates a flow of liquid product from the tank compartment and has a normally locked state. The system controller may be communicatively coupled to the valve and the fluid property sensor and include a processor and a storage medium containing computer readable and executable instructions. The executable instruction, when executed by the processor, cause the system controller to automatically to receive a transported fluid property signal from the fluid property sensor, the transported fluid property signal being indicative of at least one of a viscosity, density, dielectric constant, and temperature of the liquid product in the tank compartment. From the transported liquid type signal, the system controller automatically determines a transported liquid type of the liquid product in the tank compartment. The system controller automatically receives a stored liquid type signal indicative of a stored liquid type of a distribution tank separate from the product transport vehicle and determines the stored liquid type based on the stored liquid type signal. The system controller then automatically compares the transported liquid type to the stored liquid type. If the stored liquid type and the transported liquid type do not match, the system controller may maintain the valve in the normally locked state to prevent the flow of liquid product from the tank compartment. If the stored liquid type and the transported liquid type do match, the system controller may transition the valve from the normally locked state to an unlocked state thereby permitting the flow of liquid product from the tank compartment.

In another embodiment, a crossover protection system may include a product transport vehicle comprising a plurality of tank compartments for containing a liquid product, a plurality of valves, a plurality of fluid property sensors, and a system controller. Individual valves of the plurality of valves are coupled to one of the plurality of tank compartments and regulating a flow of liquid product from the one of the plurality of tank compartments. The individual valves of the plurality of valves have a normally locked state. Individual fluid property sensors of the plurality of fluid property sensors are positioned to contact liquid product stored in the tank compartment. The system controller is communicatively coupled to the plurality of valves and the plurality of fluid property sensors, the system controller including a processor and a storage medium containing computer readable and executable instructions. The executable instructions executed by the processor, cause the system controller to automatically receive a transported fluid property signal from individual fluid property sensors of the plurality of fluid property sensors, the transported fluid property signal being indicative of at least one of a viscosity, density, dielectric constant, and temperature of the liquid product in the tank compartment. The system controller automatically determines a transported liquid type of the liquid product in individual ones of the plurality of tank compartments based on the transported fluid property signal. The system controller automatically receives a stored liquid type signal indicative of a stored liquid type of a distribution tank separate from the product transport vehicle and determines the stored liquid type based on the stored liquid type signal. The system controller will then automatically compare the transported liquid type in each of the plurality of tank compartments to the stored liquid type. If they do not match, the system controller automatically maintains individual valves of the plurality of valves in the normally locked state to prevent the flow of liquid product from the corresponding tank compartment. If they do match, the system controller automatically transitions individual valves of the plurality of valves from the normally locked state to an unlocked state thereby allowing the flow of liquid product from the corresponding tank compartment.

In yet another embodiment, a method for preventing the mixing of dissimilar liquid products may include receiving at a system controller a stored liquid type signal indicative of a stored liquid type of a distribution tank separate from a product transport vehicle. The product transport vehicle may include a tank compartment for containing a liquid product, a valve coupled to the tank compartment, the valve regulating a flow of liquid product from the tank compartment, the valve having a normally locked state, and a fluid property sensor fluidly coupled to the tank compartment. The system controller is communicatively coupled to the valve and the fluid property sensor and the system controller includes a processor and a storage medium containing computer readable and executable instructions. The executable instructions executed by the processor, cause the system controller to automatically receive a transported fluid property signal from individual fluid property sensors of the plurality of fluid property sensors, the transported fluid property signal being indicative of at least one of a viscosity, density, dielectric constant, and temperature of the liquid product in the tank compartment. The system controller automatically determines a transported liquid type of the liquid product in individual ones of the plurality of tank compartments based on the transported fluid property signal. The system controller automatically receives a stored liquid type signal indicative of a stored liquid type of a distribution tank separate from the product transport vehicle and determines the stored liquid type based on the stored liquid type signal. The system controller will then automatically compare the transported liquid type in each of the plurality of tank compartments to the stored liquid type. If they do not match, the system controller automatically maintains individual valves of the plurality of valves in the normally locked state to prevent the flow of liquid product from the corresponding tank compartment. If they do match, the system controller automatically transitions individual valves of the plurality of valves from the normally locked state to an unlocked state thereby allowing the flow of liquid product from the corresponding tank compartment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
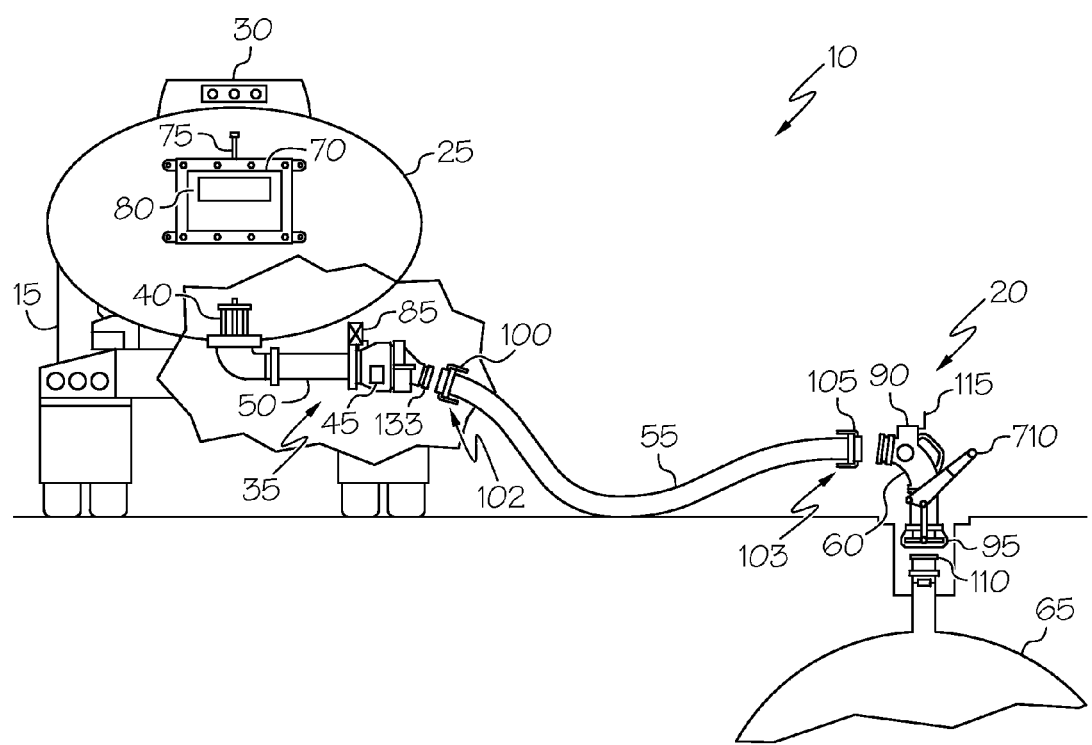
FIG. 1 schematically depicts a product transport vehicle at a product distribution station according to one or more embodiments shown and described herein.

FIG. 1 generally depicts one embodiment of a crossover protection system to prevent the co-mingling of dissimilar liquid products when filling a distribution tank at a distribution facility. The crossover protection system may be mounted on a product transport vehicle, such as a fuel truck or the like. The crossover protection system may include a system controller which is communicatively coupled to at least one fluid property sensor (FPS), at least one valve, and at least one tank tag reader. For each tank compartment on the product transport vehicle there is a FPS, a valve, and, optionally, an electronic product grade indicator (PGI) controller to serve as an interface for the operator and the system controller. The PGI controller may also assist in controlling the loading and unloading of liquid product from the corresponding tank compartment. The system controller controls the flow of liquid product to and from each tank compartment through actuation of the valve. If the potential for co-mingling of dissimilar liquid products in a tank compartment and a distribution tank is present, the system controller prevents the valve corresponding to the tank compartment from being opened thus preventing the co-mingling and cross contamination of the dissimilar liquid products.

The FPS is coupled to at least one hose connector assembly or tank compartment such that the FPS is able to detect a transported liquid type of the liquid product passing through the hose connector assembly or contained in the tank compartment. Accordingly, it should be understood that the FPS is positioned to contact liquid product stored in the tank compartment. The FPS sends a transported fluid property signal indicative of the transported liquid type to the system controller either directly or through the PGI controller. The system controller determines the liquid type transported in the tank compartment based on the transported fluid property signal from the FPS. The determination of transported liquid type may be made utilizing a look-up table (LUT) indexed according to the sensed fluid property or a database indexed according to the sensed fluid property. In embodiments, the transported liquid type, once determined, may be stored in memory, indexed according to the corresponding transportation tank.

During unloading of the tank compartment to a distribution tank, a tank tag reader is used to identify the liquid product stored in the distribution tank. Specifically, the tank tag reader is coupled to a tank delivery connector and interrogates a corresponding tank tag located on a distribution tank. The tank tag contains information that relates to the liquid product type stored in the distribution tank. The tank tag reader transmits a stored liquid type signal indicative of the store liquid type to the system controller of the product transport vehicle. The system controller automatically compares the transported liquid product type information taken from the FPS to the stored liquid type from the tank tag to determine if a match exists. When a match exists, the system controller enables (i.e., unlocks) either an emergency valve, a control valve, or a separate adaptor locking device (for example a lockable loading and unloading adaptor, an API adaptor, or the hose adaptor described in greater detail below) to allow the unloading of the liquid product from the tank compartment to the distribution tank. The system controller may also prevent the flow of liquid product if the transported liquid type and the stored liquid type do not match by disabling (i.e., maintaining the valve in a locked state) either the emergency valve, the control valve, or the separate adaptor locking device. The system controller may also prevent the flow of liquid product if other relevant delivery site information stored in the tank tag, such as geo-location data, physical address information, customer account information or the like, does not match. Various embodiments of the crossover protection system and the operation of the crossover protection system will be described in more detail herein with specific reference to the appended drawings.

Figure 7:
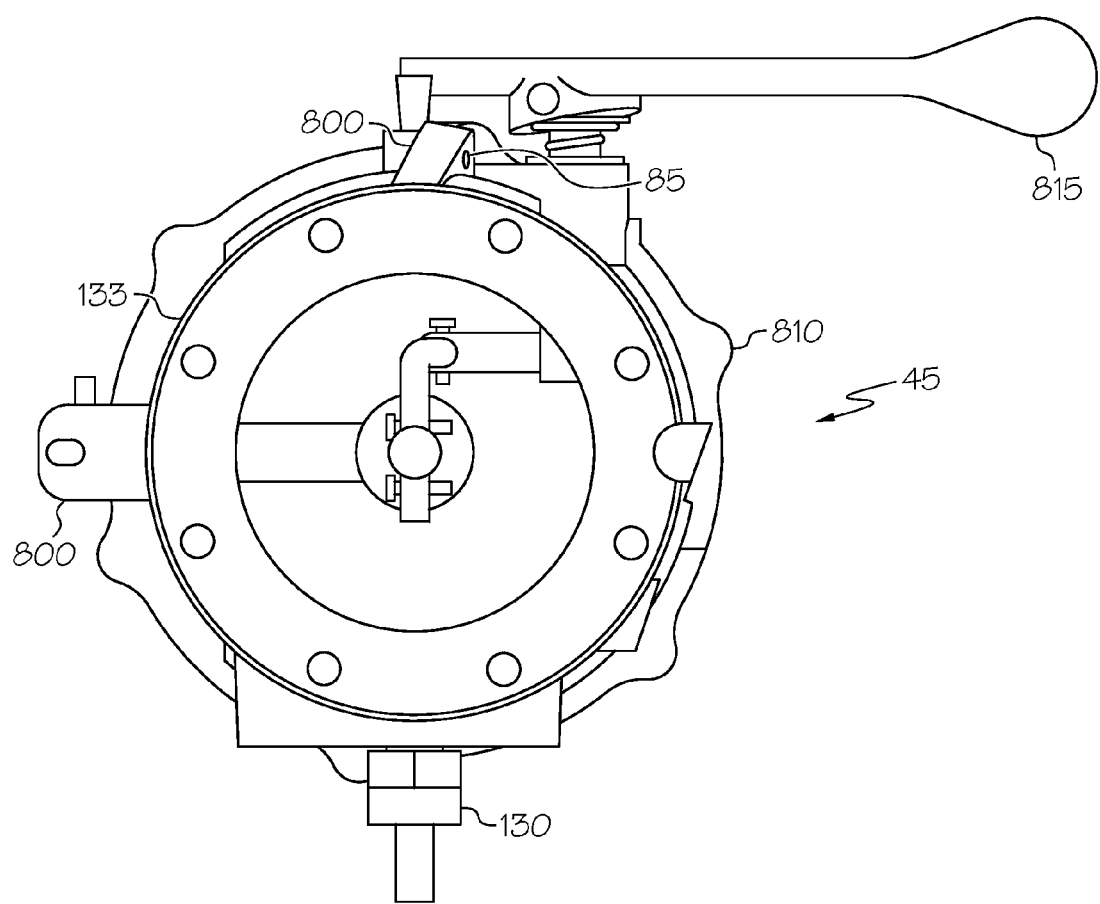
FIG. 7 is a front view of a control valve according to one or more embodiments shown and described herein.
Figure 8:
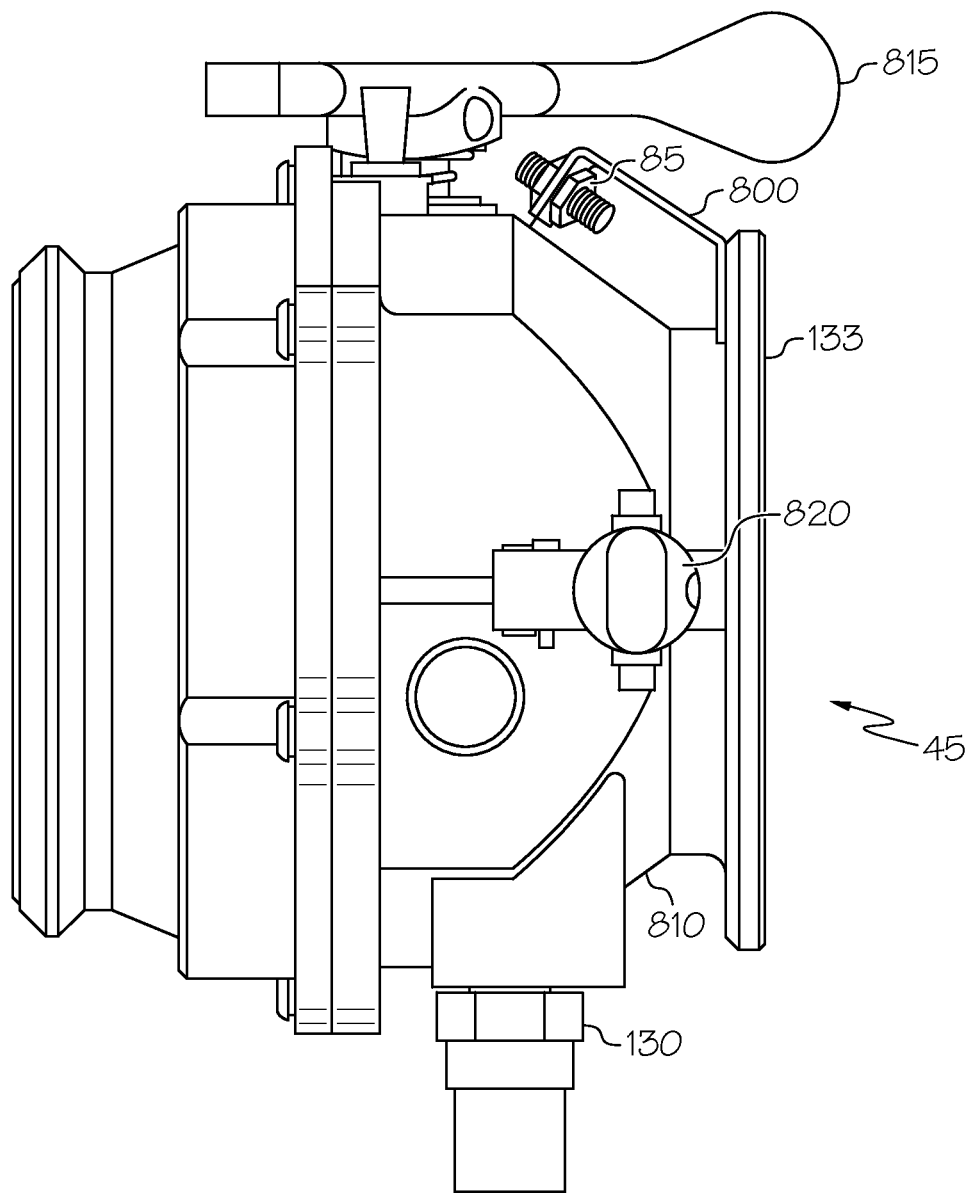
FIG. 8 is a side view of the control valve according to one or more embodiments shown and described herein.

FIG. 1 schematically depicts a product transport vehicle 15 at a distribution station 20. The product transport vehicle 15 may be used to transport liquid product between two points, such as between a fuel depot and retail distribution station. For example, the product transport vehicle 15 may be a tanker truck used to transport fuel products between the fuel depot (shown in FIG. 4) and the distribution station 20. The product transport vehicle 15 may have a plurality of tank compartments 25 for containing liquid product, where each tank compartment 25 may have a manlid 30 and a hose adaptor assembly 35. Each hose adaptor assembly 35 may include an emergency valve 40 fluidly coupled to the bottom of the tank compartment 25, a control valve 45, and a pipe connection 50 fluidly coupling the emergency valve 40 to the control valve 45. An example of a suitable emergency valve is the MaxAir series of internal valves by Civacon. An example of a suitable control valve is the API Adaptor, model number 891BA-LK by Civacon. However, it should be understood that alternative valves may be used. A hose adaptor 133 may be coupled to the control valve 45 or the pipe connection 50. In some embodiments, the control valve 45 and the hose adaptor 133 are a single assembly as shown in FIGS. 7 and 8 and described in greater detail herein. An example of a suitable hose adaptor 133 is the gravity coupler, model number 871 or 876 by Civacon. However, it should be understood that alternative hose adaptors may be used. In embodiments, the hose adaptor assembly 35 may include both the emergency valve 40 and the control valve 45 as shown in FIG. 1. Alternatively, the hose adaptor assembly 35 may only include either the emergency valve 40 or the control valve 45. The individual valves (control valve 45 and/or emergency valve 40) of the plurality of valves regulate the flow of liquid product into and out of the corresponding tank compartment 25. A delivery hose 55 may be used to fluidly couple the hose adaptor 133 to a tank delivery connector 60. The tank delivery connector 60, in turn, may be used to fluidly couple the tank compartment 25 with a distribution tank 65 located at the distribution station 20. The tank delivery connector 60 may be removably coupled to the delivery hose 55 and the distribution tank 65.

In the embodiments described herein, at least one of the control valve 45 and the emergency valve 40 has a normally locked state. The phrase "normally locked state" means that the system controller 70 (described in further detail herein) coupled to the valve (e.g. the emergency valve 40 and/or the control valve 45) maintains the valve in a closed and locked position and that the valve can only be unlocked upon confirmation of a match between a stored liquid type and a transported liquid type contained in a corresponding tank compartment 25. When a match is confirmed, the system controller 70 automatically transitions the valve corresponding to a tank compartment 25 with the same product to an unlocked state. In the unlocked state, the valve can be opened or closed by an operator either manually or through the system controller, thereby facilitating the unloading of the transported liquid product contained in the corresponding tank compartment 25.

Figure 2:
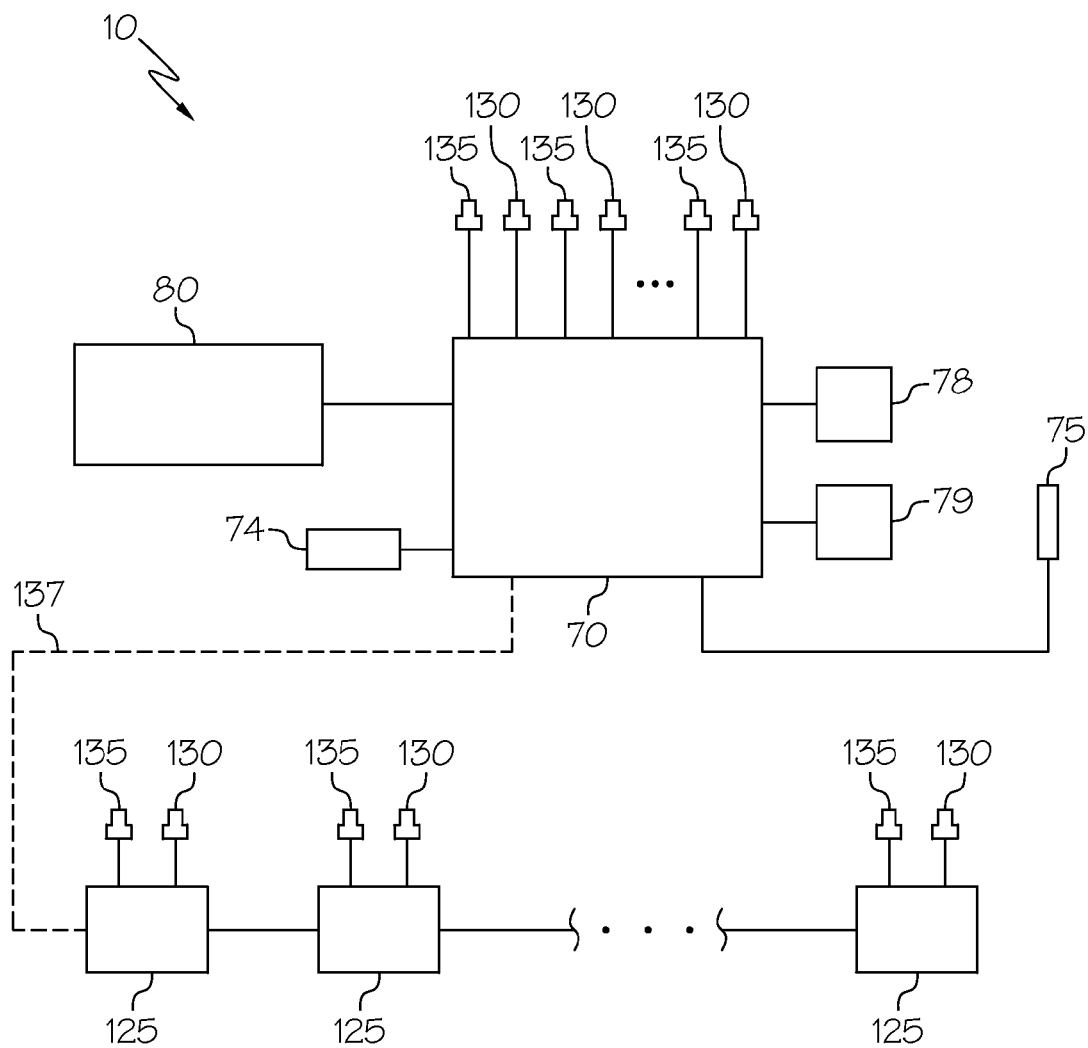
FIG. 2 schematically depicts a crossover protection control system according to one or more embodiments shown and described herein.

Referring now to FIGS. 1-3, the crossover protection system 10 may further include a system controller 70 and a tank tag reader 95 for interrogating a tank tag 110 coupled to a distribution tank 65, such as an underground storage tank or similar storage tank. The system controller 70 may include a fluid property sensor (FPS) 130, a pressure sensor 135, a controller antenna 75, an accelerometer 78 for determining when the product transport vehicle is in motion or stationary, a wireless communication module 74 one or more input devices (not shown) such as a keypad or the like, a solenoid valve assembly to pneumatically control the plurality of valves (described in greater detail herein), a display 80, a computer-readable medium (such as a memory or the like), and a processor. In some embodiments, the system controller 70 may further comprise a parking brake sensor 79 communicatively coupled to the processor. The parking brake sensor 79 may be utilized to determine when the product transport vehicle 15 is parked such that a loading or unloading operation may be initiated.

The system controller 70 may be communicatively coupled to the FPS 130 and the pressure sensor 135. An example of a suitable pressure sensor is the diaphragm pressure sensor, model number 1E/F by Televac. However, it should be understood that alternative pressure sensors may be used, such as, for example, a piezo pressure sensor or an electric pressure sensor. It is contemplated that the FPS 130 and the pressure sensor 135, if both are installed on the product transport vehicle 15, may be installed in the same location or at separate locations. For example both the FPS 130 and the pressure sensor 135 may be coupled to the tank compartment 25. Alternatively, the pressure sensor 135 and/or the FPS sensor may be coupled to the pipe connection 50. The FPS 130 may be positioned in the pipe connection 50 such that the FPS 130 is able to interact with liquid product flowing through the pipe connection 50, thereby allowing the system controller 70 to discriminate between different liquid products, such as a "distillate" versus a "gasoline" product. An example of a suitable FPS 130 is the tuning fork sensor model number FPS2800B12C4 by Measurement Specialties. However, it should be understood that alternative sensors may be used. In another embodiment, the FPS 130 may be located in the tank compartment 25 and positioned to contact liquid product stored in the tank compartment.

The processor of the system controller 70 may be used to execute a set of instructions recorded on the computer-readable medium to prevent the cross contamination of product stored in the distribution tank 65 with dissimilar product stored in one or more of the tank compartments 25 of the product transport vehicle 15. The processor may be communicatively coupled to the controller antenna 75, accelerometer 78, wireless communication module 74, one or more input devices, the display 80, and the computer-readable medium. The system controller 70 may be powered by 12 VDC, 24 VDC power or a portable power source such as a battery source and/or a solar cell, for example. The display 80 may be an alphanumeric display that presents information, such as system status or the like, to the operator. The display 80 may be positioned anywhere on the product transport vehicle 15 and may be electrically coupled to the system controller 70. For example, in one embodiment, the display is wirelessly coupled to the system controller and is positionable and relocatable on the product transport vehicle 15. In embodiments, status information displayed on the display may include which tank compartments 25 are empty or have some amount of liquid product in them as indicated by the plurality of pressure sensors 135. In embodiments, status information may also include the transported liquid type associated with each tank compartment 25 as sensed by an FPS 130 and determined by the system controller 70. Further, status information may also include the stored liquid type of the liquid product stored in a distribution tank 65. In addition to the transported liquid type of the liquid product in each tank compartment 25, other information related to the crossover protection system may also be presented, including, without limitation, battery life remaining, any fault codes, and/or tank tag identification information. The display 80 may include a schematic diagram of the product transport vehicle 15 indicating the status of the tank compartments 25 and schematically depicting fluid flow while in operation. In embodiments, the display 80 may be a touch screen. The keypad or plurality of input devices may include north, south, east, west arrow navigation keys, an enter key, an override key, and/or a numeric keypad.

The system controller 70 may include a set of communication ports (not shown) to communicatively connect to the wireless communication module 74, or to an in-cab black box (not shown) where the processor, computer-readable medium, an onboard overfill detection system (not shown), and other components that may reside on the product transport vehicle 15. A local power port (not shown) may be included to provide power to the system controller 70 in the event the power source failure or battery source failure/depletion. A communication port may be included to communicatively connect to other devices using RS-485 protocol, CANbus protocol J1939, CAN open, or a similar protocol, and a 6-pin cable. The tank tag reader 95 may be communicatively coupled to the system controller 70 with electrical wires (not shown) or wirelessly utilizing standard wireless communication protocols. Suitable wireless communication protocols may include the 802.11 families of protocols, the Bluetooth® protocol, the ZigBee IEEE 802 Standard protocol, or the like. In some embodiments, the system controller 70 may wirelessly communicate with the tank tag reader 95 via a pair of antennas, for example the controller antenna 75 and/or the tank connector antenna 115.

The system controller 70 may log and time stamp all events as they occur within the crossover protection system 10. For example, the system controller 70 may log trip records, stored liquid type, transported liquid type, tank compartment usage, amount of liquid product loaded and unloaded, and similar events. The system controller log may be downloaded and used to reconstruct trip events with a computer. In embodiments, the computer-readable medium (i.e., memory) may be large enough to hold either an estimated 30 days worth of trip logs. Alternatively or additionally, the computer-readable medium may be large enough to hold an estimated 200 trip logs. In some embodiments, the in-cab black box may be communicatively connected to an on-truck computer (not shown) to enable the logs to be uploaded to a remote computer system wirelessly through the on-product transport vehicle communication systems.

Referring specifically to FIG. 2, the crossover protection system 10 is schematically depicted as it relates to components on the product transport vehicle 15 of FIG. 1. The system controller 70 may receive a transported fluid property signal from the FPS 130 indicative of at least one of a viscosity of the liquid product in the tank compartment 25, a density of the liquid product in the tank compartment 25, a dielectric constant of the liquid product in the tank compartment 25, and a temperature of the liquid product in the tank compartment 25. The system controller 70 may determine a transported liquid type of liquid product in the tank compartment 25 based on the transported fluid property signal sent from the FPS 130. For example, in some embodiments, the system controller 70 may include a liquid type look-up table (LUT) stored in memory. The look-up table may contain a plurality of liquid types indexed according to one or more properties at a specified temperature or temperatures. These properties may include the viscosity, density, and dielectric constant or combinations thereof. Using this LUT, the system controller 70 may determine the liquid product stored in the tank compartment 25 based on the transported fluid property signal received from the FPS 130.

As noted hereinabove, the pressure sensor 135 may be positioned in either the pipe connection 50 or the tank compartment 25 such that the pressure sensor 135 is able to detect the pressure of the liquid product within the pipe connection 50 and the tank compartment 25, thereby allowing the system controller 70 to detect static pressure in the tank compartment 25 and gauge the approximate level or amount of product in the tank compartment 25. The PGI controller 125 may also display the amount of liquid product remaining in the tank compartment 25 as determined by the pressure sensor 135. In another embodiment, the system controller 70 may display the amount of liquid product remaining in the tank compartment 25 as determined by the pressure sensor 135 on the display 80. The system controller 70 may receive a pressure signal from the pressure sensor 135. The pressure signal may indicate the amount of liquid product present in the tank compartment 25. The system controller 70 may display the transported liquid type indicated by the transported liquid type signal and/or the amount of liquid product indicated by the pressure signal on the display 80 of FIG. 1.

The system controller 70 may also receive an accelerometer signal from the accelerometer 78. The accelerometer signal may indicate whether the product transport vehicle 15 is in motion or not. The system controller 70 may use the accelerometer signal to either maintain the valves in the normally locked state while the product transport vehicle 15 is in motion or transition the valves to the normally locked state when the accelerometer 78 indicates that the product transport vehicle 15 has started to move.

Still referring to FIG. 2, in some embodiments, one or more PGI controllers 125 may be communicatively coupled with the plurality of FPS 130 and the plurality of pressure sensors 135. In embodiments, individual PGI controllers 125 may be associated with a specific hose adaptor assembly 35 and/or associated tank compartment 25 and may be used in conjunction with the system controller to regulate the flow of fluid to and from each tank compartment. However, it should be understood that the PGI controllers are optional and that in some embodiments the crossover protection system does not utilize PGI controllers.

Figure 3A:
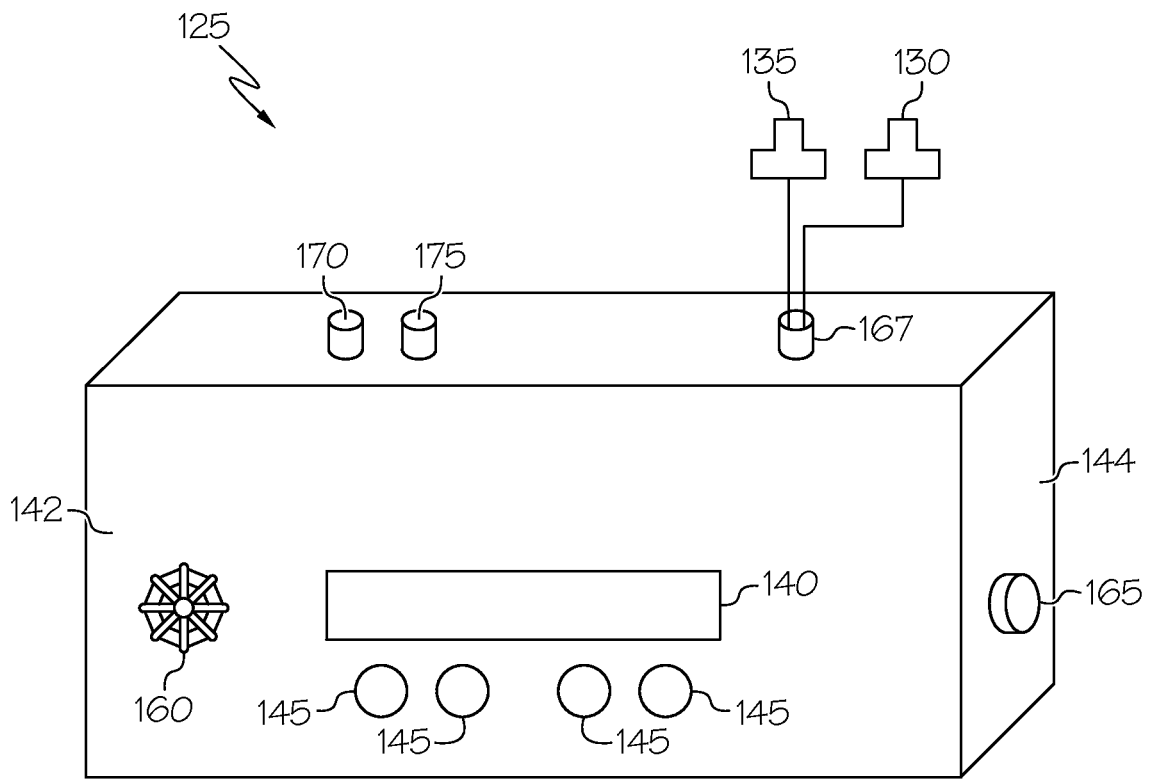
FIG. 3A schematically depicts an electronic product grade indicator controller according to one or more embodiments shown and described herein.

Referring now to FIG. 3A, an embodiment of a PGI controller 125 is schematically depicted. Each PGI controller 125 of the plurality of PGI controllers is associated with a tank compartment 25 of the plurality of tank compartments. The PGI controller 125 may have a computer-readable medium (i.e., a memory) and a processor to execute a set of instructions recorded on the computer-readable medium. The processor may be communicatively coupled to a PGI display 140, a plurality of input devices 145, an alert device, a solenoid valve assembly to pneumatically control the valves corresponding to the tank compartment 25 the PGI controller 125 is associated with, a pressure switch 155, a loading arm sensor (loading arm coupler proximity/detection sensor) input and the computer-readable medium. The PGI display 140, such as a liquid crystal display or a similar electronic display, is mounted to a PGI face 142 of the PGI controller 125. The plurality of input devices 145 may also be mounted to the PGI face 142 of the PGI controller 125 to allow an operator to interact with the PGI controller 125 and enter liquid product identification information into the PGI controller 125. The plurality of input devices 145 and the PGI display 140 allow an operator to choose the liquid product type that is being loaded into the tank compartment 25 to which the PGI controller 125 is associated. For example, the plurality of input devices 145 may be buttons to allow the operator to scroll up and down through a list of liquid product types stored in a computer readable medium of the PGI controller 125 and displayed on the PGI display 140. The input devices 145 allow the operator to make a selection from the list or, alternatively, to directly input liquid product information into the PGI controller 125 identifying the contents of the transportation tank. 25. In some embodiments, the PGI controller 125 may include an "empty" input device which allows the operator to quickly indicate the tank compartment 25 is empty. The plurality of input devices 145 may include, without limitation, a keypad, scroll wheel, touchpad, or any other suitable input device that enables an operator to interact with the PGI controller 125. In some embodiments, an audio device 160 may be mounted to the face of the PGI controller 125 and may provide an audible signal to draw the attention of the operator to the PGI controller 125.

A PGI connector 165 may be connected to a PGI body 144 to electrically couple the plurality of PGI controllers 125 together and to electrically couple the plurality of PGI controllers 125 to the system controller 70. A sensor connector 167 may be connected to the PGI body 144 to electrically couple the FPS 130 and/or the pressure sensor 135 to the PGI controller 125. An air input connector 170 and an air output connector 175 for use by a PGI pneumatic system 180 as shown in FIG. 3B may also be mounted to the PGI body 144.

Figure 3B:
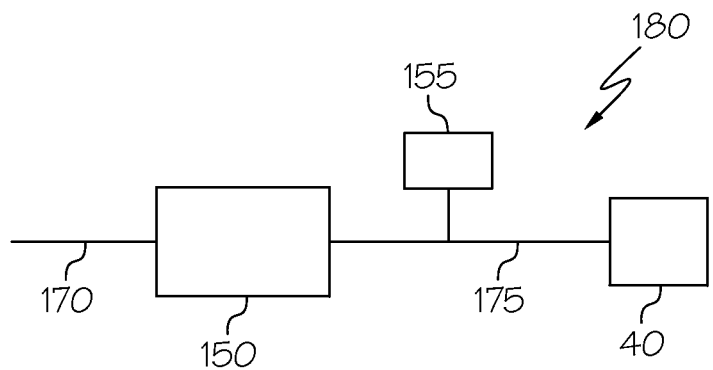
FIG. 3B schematically depicts a product grade indicator pneumatic system according to one or more embodiments shown and described herein.

Referring now to FIGS. 2, 3A, and 3B, FIG. 3B is a schematic view of the PGI pneumatic system 180. The PGI pneumatic system 180 may be coupled to the hose adaptor assembly 35, the emergency valve 40 and/or the control valve 45. The PGI pneumatic system 180 either maintains the valve to which it is connected in the normally locked state and transitions the valve from the normally locked state to an unlocked state based on instructions received from the PGI controller 125 and/or the system controller 70. The solenoid valve assembly 150 and the pressure switch 155 of the PGI pneumatic system may be mounted internal to the PGI controller 125 or the system controller 70. Pressurized air may be fed into the solenoid valve assembly 150 through the air input connector 170 on the PGI body 144 or a system controller body (not shown). When the PGI controller 125 or system controller 70 opens the solenoid valve assembly 150, the pressurized air actuates the pressure switch 155 and transitions the valve from the normally locked state to the unlocked state thereby allowing liquid product to flow out of the tank compartment 25. The PGI pneumatic system 180 delivers pressurized air to the valve using the air output connector 175. In embodiments, the solenoid valve assembly 150 may be manually opened by the operator activating a valve manual override input device on the PGI controller 125 or the system controller 70. In some embodiments, the solenoid valve assembly 150 may be a normally locked solenoid valve. Based on the foregoing, it should be understood that the PGI pneumatic system 180, whether contained in the PGI controller 125 or the system controller 70, may control the locking/unlocking of the corresponding valve as well as the opening and closing of the corresponding valve to allow or prevent fluid flow.

While the PGI pneumatic system has been described herein as being coupled to or a part of the PGI controller, in some embodiments, the system controller 70 may incorporate all the functions of the plurality of PGI controllers 125. In these embodiments, the system controller 70 includes the PGI pneumatic system 180 for each valve on the product transport vehicle 15. For example, all the solenoid valve assemblies 150 may be combined together in a manifold arrangement and mounted in a separate location and electrically coupled to the system controller 70. In these embodiments, the system controller 70 may also include the plurality of input devices 145, and alert devices. This would eliminate the need for a plurality of PGI controllers 125 and associated equipment.

In embodiments, the PGI controller may be used by an operator to manually enter the transported liquid type into the system controller 70. The transported fluid property signal and/or the pressure signal may also be received by an individual PGI controller. The PGI controller may be communicatively coupled with the system controller 70 and transmit the transported fluid property signal and/or the pressure signal to the system controller 70 for processing by the processor. The PGI controller 125 may also display the transported liquid type indicated by the transported liquid type signal and/or the amount of liquid product indicated by the pressure signal on the PGI display 140 of FIG. 3A.

The operator may override the system controller 70 using the plurality of input devices 145 on the PGI controller 125 or on the system controller 70. A log of any override action taken by the operator may be stored in the system controller 70 memory for later retrieval and analysis.

In some embodiments, each PGI controller 125 may be communicatively coupled to another PGI controller 125 as shown in FIG. 2 or multiple PGI controllers 125, and at least one of the PGI controllers 125 is coupled to the system controller 70. Alternatively, each PGI controller 125 may be directly coupled to the system controller 70. In one embodiment, a total of twelve PGI controllers 125 may be communicatively coupled to the system controller 70 with a six-pin cable 137, such as when the product transport vehicle 15 (shown in FIG. 1) contains twelve separate tank compartments 25. In some embodiments, a PGI controller 125 may be mounted to each hose adaptor assembly 35 and may be used to indicate the transported liquid type that is stored in the tank compartment 25. For example, the PGI controller 125 receives a signal from either the system controller 70 or the FPS 130 indicative of the transported liquid type of liquid product stored in the tank compartment 25 and displays the liquid product type. The display of information may be done on the display 80 and/or a PGI display 140 (shown in FIG. 3A). In another embodiment, an operator may input a loaded liquid type of liquid product that is being stored in the tank compartment 25 directly into the PGI controller 125 when the tank compartment 25 is filled at the loading station. The PGI controller 125 may display the loaded liquid type. The display of information may be done on the display 80 and/or a PGI display 140 (shown in FIG. 3A). In embodiments where the product transport vehicle 15 is used to store liquid petroleum products, the type of liquid product may be, for example gasoline, diesel, kerosene, etc. However, it should be understood that other types of liquid products may be stored in the tank compartments 25 and the PGI controller 125 and/or the system controller 70 may be used in a similar manner to identify those liquid products.

Referring again to FIG. 1, in embodiments, the hose adaptor assembly 35 for each tank compartment 25 may be fluidly coupled to a distribution tank 65 with a tank delivery connector 60 and a delivery hose 55. The tank delivery connector 60 may be an elbow coupler, a straight coupler, or a flexible coupler. An example of a suitable tank delivery connector 60 is the product delivery elbow, model number 60TT, 65TT, or 70TT by Civacon. However, it should be understood that alternative tank delivery connectors may be used. In embodiments where a tank delivery connector 60 is used to fluidly couple the hose adaptor assembly 35 to a distribution tank 65, the tank tag reader 95 may be located on the tank delivery connector 60 and positioned to read a corresponding tank tag 110 located on the distribution tank 65 when the tank delivery connector 60 is coupled to the distribution tank 65.

While FIG. 1 schematically depicts the use of a tank delivery connector 60 to couple the hose adaptor assembly 35 to the distribution tank 65, it should be understood that, in some embodiments, the tank delivery connector 60 may be omitted, such as when the hose adaptor assembly 35 is directly coupled to a distribution tank 65 with a delivery hose. In these embodiments, the tank tag reader 95 may be located on one end of the delivery hose and positioned to read a corresponding tank tag 110 located on the distribution tank 65 when the delivery hose is coupled to the distribution tank 65.

In some embodiments, the system controller 70 and associated components may be configured to determine that a valve corresponding to a tank compartment 25 to be unloaded is fluidly connected to a corresponding tank delivery connector 60 attached to a distribution tank 65 to prevent product spills. In some embodiments, the system controller 70 may also confirm that the same delivery hose 55 is fluidly coupled between the valve and the tank delivery connector 60 utilizing a set of RFID tags and a plurality of tag readers.

The system controller 70 may be communicatively coupled to an adaptor tag reader 85 and a hose tag reader 90. The adaptor tag reader 85 may be positioned on the hose adaptor 133 or a valve, e.g. the control valve 45. The hose tag reader 90 may be positioned on the tank delivery connector 60 in a location adjacent to the coupling point of a delivery hose 55 and opposite the tank tag reader 95. The delivery hose 55 may have a lock tag 100 at a lock end 102 of the delivery hose 55 and a connector hose tag 105 at a connector end 103 of the delivery hose 55. Both the lock tag 100 and the connector hose tag 105 may have the same hose ID information encoded on them, e.g. a first hose ID, a second hose ID, etc.

When the delivery hose 55 is coupled to the hose adaptor 133, the adaptor tag reader 85 interrogates the lock tag 100 and transmits the identification information (e.g. the first hose ID) to the system controller 70. When the delivery hose 55 is coupled to the tank delivery connector 60, the hose tag reader 90 interrogates the connector hose tag 105 and transmits the identification information (e.g. the first hose ID) to the system controller 70.

Referring to FIGS. 7 and 8, a front view and a side view of the control valve 45 is depicted. The control valve 45 and the hose adaptor 133 may be a single assembly as shown. The adaptor tag reader 85 may be coupled to a tag mount 800 and positioned on the hose adaptor 133 as shown or on the control valve body 810. In some embodiments, the FPS 130 may also be coupled to the control valve body 810 as shown. A control valve lever 815 is coupled to the control valve 45 and used by the operator to manually (e.g. physically) transition the control valve 45 from the normally locked state to the unlocked state. A pneumatic lock 820 may be coupled to the control valve body 810 and pneumatically coupled to the solenoid valve assembly of the PGI controller and/or the system controller. The pneumatic lock 820, when enabled by the PGI controller and/or the system controller, allows the control valve 45 to be transition from the normally locked state to the unlocked state and thereby open the control valve 45. The pneumatic lock 820 is coupled to the control valve lever 815 internal to the control valve body 810 and mechanically restricts (i.e. stops) the movement of the control valve 45 in the normally locked state.

In one embodiment, the system controller 70 verifies that a delivery hose 55 is coupled to each of the tank delivery connector 60 and the hose adaptor 133 and/or control valve 45. For example, when the delivery hose 55 is properly coupled to the tank delivery connector 60, the hose tag reader 90 is positioned to read the connector hose tag 105 and transmit a hose signal indicative of the hose ID to the system controller 70. In this embodiment, receipt of the hose signal indicative of the hose ID by the system controller 70 is sufficient to confirm that the delivery hose 55 is properly coupled to the tank delivery connector 60. Similarly, when the delivery hose 55 is properly coupled to the hose adaptor 133 or the control valve 45, the adaptor tag reader 85 is positioned to read the lock tag 100 and transmit a hose signal indicative of the hose ID to the system controller 70. In this embodiment, receipt of the hose signal indicative of the hose ID by the system controller 70 is sufficient to confirm that the hose is properly coupled to the hose adaptor 133 or the control valve 45. When the system controller 70 confirms that the delivery hose 55 is properly coupled to both the tank delivery connector 60 and the hose adaptor 133 or control valve 45, the system controller 70 may allow the corresponding control valve 45 to transition from the normally locked state to the unlocked state, subject to a determination that the transported liquid product type in the corresponding compartment matches the stored liquid product type of the distribution tank 65.

In another embodiment, the system controller 70 may confirm that a specific tank compartment 25 is fluidly coupled to a specific distribution tank 65 by matching the identification information of the lock tag 100 and the connector hose tag 105 and verifying the delivery hose 55 fluidly connects the specific control valve 45 or hose adaptor 133 to the correct tank delivery connector 60.

For example, the adaptor tag reader 85 may transmit the hose ID information to the system controller 70 using a bus or similar wiring method. In another embodiment, the adaptor tag reader 85 may transmit the hose ID information to the system controller 70 using a wireless connection, such as the wireless protocol and devices described herein. The hose tag reader 90 transmits the hose ID information to the system controller 70 using a wireless connection, such as the wireless protocol and devices as described above.

The tank tag reader 95 may further transmit a tank delivery connector ID signal to the system controller 70 indicative of an identity of the tank delivery connector 60. The tank delivery connector ID signal may be used to pair the tank delivery connector 60 to the system controller 70 associated with the product transport vehicle 15. For example, referring to FIG. 5, the system controller 70 may be paired with a first tank delivery connector 60a having a first tank delivery connector ID and a second tank delivery connector 60b having a second tank delivery ID. The pairing of the first tank delivery connector 60a and the second tank delivery connector 60b may ensure that the system controller 70 is not processing any information relating to a non-paired tank delivery connector 60 at the same distribution station.

When the system controller confirms that the delivery hose 55 is properly coupled to both the tank delivery connector 60 and the hose adaptor 133 or control valve 45 based on the received hose ID information, the system controller 70 may allow the corresponding control valve 45 to transition from the normally locked state to the unlocked state, subject to a determination that the transported liquid product type in the corresponding tank compartment 25 matches the stored liquid product type of the distribution tank 65.

In another embodiment, the crossover protection system configuration may be such that the delivery hose 55 may not have a lock tag 100 attached to the lock end 102 or connector hose tag 105 attached to the connector end 103 of the delivery hose 55 as described above. The tank tag reader 95 may read the tank tag 110 and transmit the tank tag's encoded liquid product type information directly to the system controller 70. The system controller 70 may allow or not allow the liquid product transfer based on the liquid product type information from the tank tag 110 without the need to verify the identity of the delivery hose 55. In this embodiment, the system controller 70 may enable only those valves that correspond to those tank compartments 25 that have a matching transported liquid type to transition from the normally locked state to the unlocked state. The system controller 70 may not act upon, or receive any other stored liquid type signals from other tank tag readers 95 until one of the valves that has been enabled is transitioned to the unlocked state. The system controller 70, by only allowing a single tank compartment 25 to be unloaded at a time, can determine that the tank delivery connector 60 attached to the distribution tank 65 and is fluidly coupled to the matching tank compartment 25.

Figure 5:
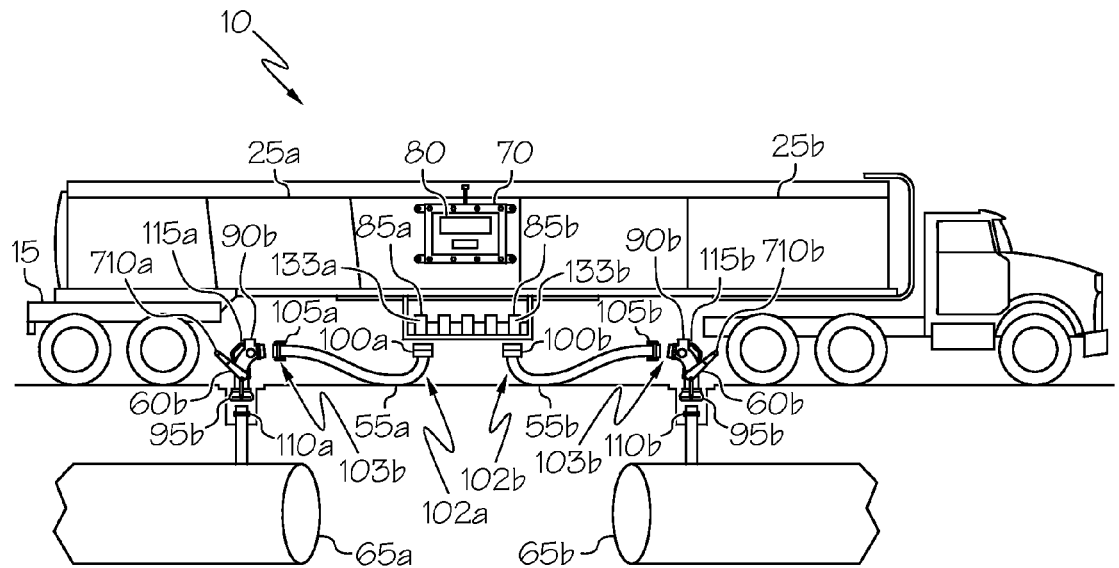
FIG. 5 schematically depicts the product transport vehicle at the distribution station according to one or more embodiments shown and described herein.
Figure 6:
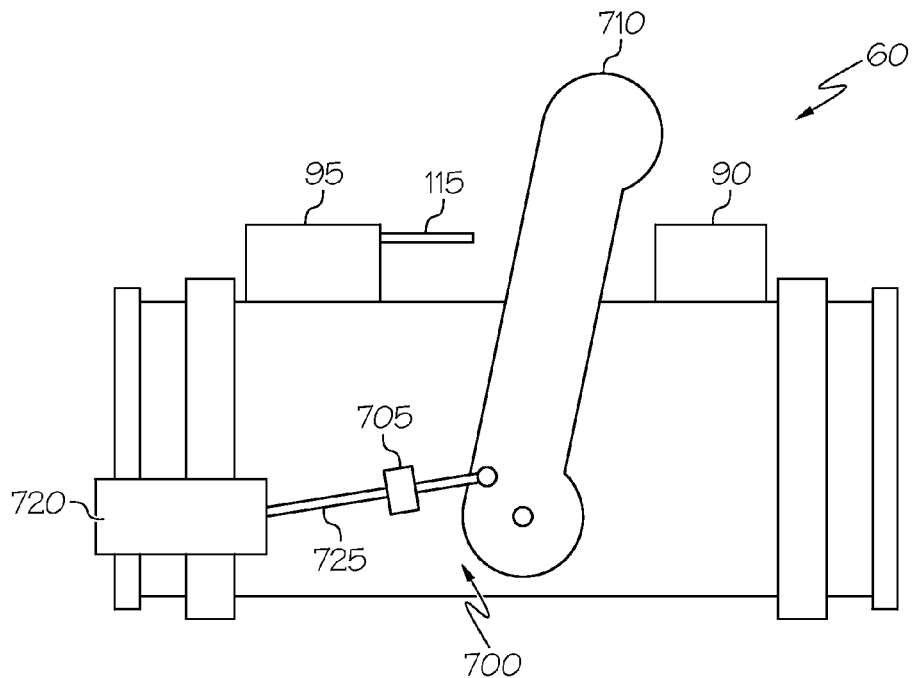
FIG. 6 is a side view of a tank delivery connector according to one or more embodiments shown and described herein.

Referring now to FIGS. 1, 5, and 6, in another embodiment, the tank delivery connector 60 may include a lock mechanism 700 coupled to the tank delivery connector 60, a power supply (not shown), and a lock sensor 705. The lock mechanism 700 may include a locking lever 710 with a locked position and an unlocked position coupled to a locking clamp 720. The locking lever 710, when in the unlocked position, maneuvers the locking clamp 720, via a lock shaft 725, to allow the coupling of the tank delivery connector 60 to the distribution tank 65. In the locked position, the locking lever 710 maneuvers the locking clamp 720, via the lock shaft 725, to compress a coupler (not shown) on the distribution tank to the tank delivery connector 60. In the locked position, the lock mechanism 700 mechanically secures the tank delivery connector 60 to a corresponding distribution tank 65. The power supply is coupled to the tank delivery connector and provides power for the tank tag reader 95; the hose tag reader 90 and/or the lock sensor 705. The lock sensor 705 is mechanically coupled to the lock mechanism 700 and electrically coupled to the tank tag reader 95 and may be a magnetic sensor, contact sensor, optical sensor, or the like. In one embodiment, the lock sensor 705 is a proximity sensor which senses whether the locking lever 710 is in the locked position and/or the unlocked position based on the locking lever's 710 position relative to the lock sensor 705. For example, the lock sensor 705 may provide the tank tag reader 95 with a delivery connector locked signal when the locking lever 710 is in the locked position. The tank tag reader 95 transmits the delivery connector locked signal to the system controller 70 when the tank delivery connector 60 is secured to the distribution tank 65. In one embodiment, power to the tank tag reader 95 may only be provided when the locking lever 710 is in the locked position as indicated by the lock sensor 705. The system controller 70 won't receive the tank tag signal until the tank delivery connector 60 is coupled to the distribution tank 65 and in the locking lever 710 is in the locked position.

In yet another embodiment, the tank delivery connector 60 may include the locking mechanism 700 for locking the tank delivery connector 60 to the distribution tank 65, the power supply, and a switch (not shown). The switch may be mechanically coupled to the locking mechanism 700 and electrically coupled to the power supply and the tank tag reader 95. When the switch is actuated (e.g. pressed or toggled), the tank tag reader 95 will interrogate the tank tag 110 and transmit the stored liquid type signal to the system controller 70. In some embodiments, the switch may be positioned such that transitioning the locking lever 710 of the locking mechanism 700 from the unlocked state to the locked state may toggle the switch. In these embodiments, the switch may be used to "wake-up" the tank tag reader 95 which then automatically reads the tank tag 110 and transmits the stored fluid type signal to the system controller 70.

As described herein, the system controller 70 may use tags to prevent the mixing of dissimilar liquid products during loading and unloading of the liquid product and to verify coupling between the tank compartments of the product transport vehicle and a distribution tank. The adaptor tag reader 85, hose tag reader 90, and tank tag reader 95 (tag readers) shown in FIG. 1 may interrogate the lock tag 100, connector hose tag 105, and the tank tag 110 (tags) during operation of the crossover protection system 10. These tag readers may use optical interrogation, radio frequency interrogation, and/or physical interrogation to read the information encoded on the tags. For example, the tag readers may use an optical device, such as an image sensor, to take an image of the tag and decode the information contained on the tag. The tag reader may also be a laser scanner and/or bar code reader used to read the tag which may include a barcode or equivalent indicia. Alternatively, the tag readers include tactile input devices such as keypads or the like such that a product ID number found on the tag may be input into the tag reader by an operator. In the embodiments described herein, the tag readers are Radio Frequency Identification Device (RFID) tag reader and the tags are RFID tags. In embodiments, the tags may be passive RFID tags where the tag does not allow a read/write capability to occur within a tag memory.

In yet another embodiment, the system configuration may be such that the tags may be active RFID tags. The active RFID tag may allow the tag readers to read the tag's encoded information and write or overwrite information on the tags. For example, the liquid product type information may need to be changed to correspond to a change in type of liquid product being stored in the distribution tank 65. Or additional information may need to be included to the encoded information such as, for example, a timestamp of the last fill, the delivery vehicle ID number, the delivery company name, and/or batch number of the liquid product, etc.

Figure 4:
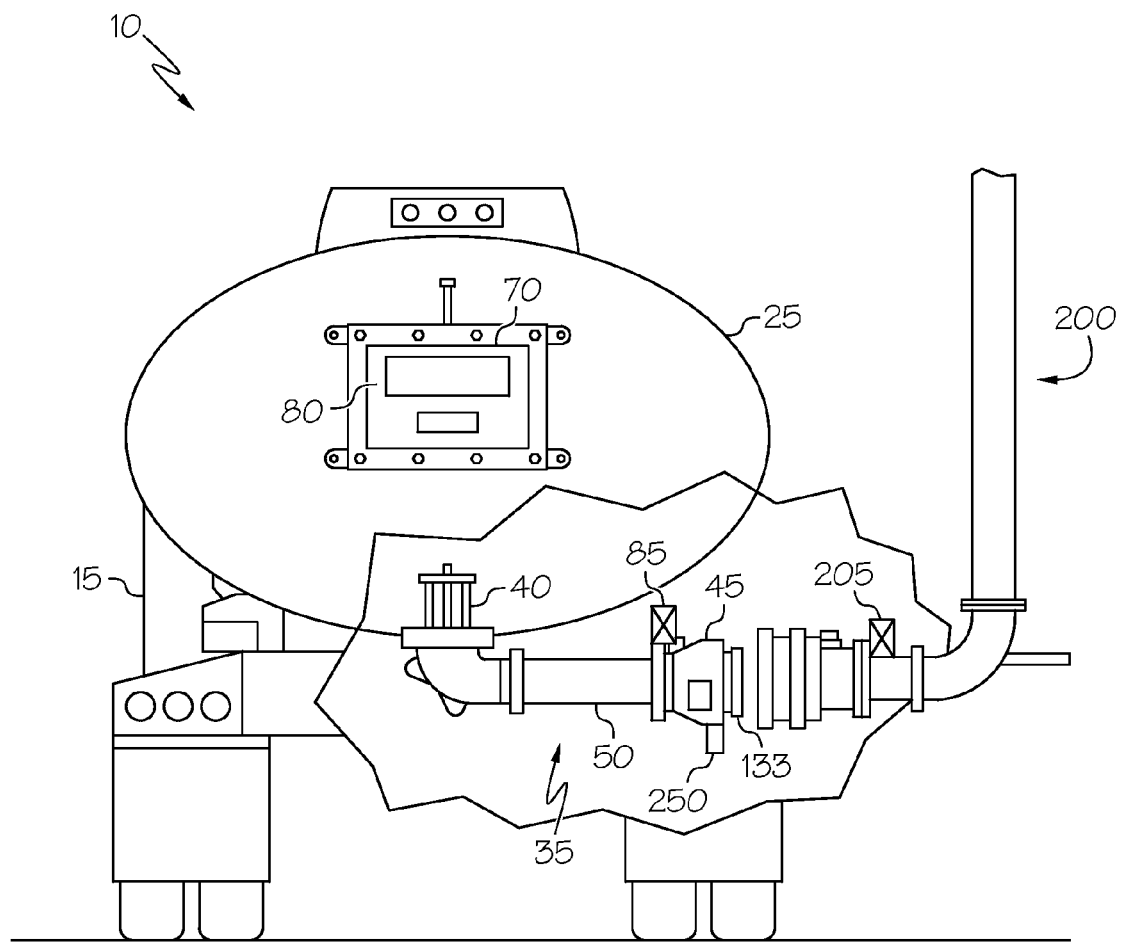
FIG. 4 schematically depicts the product transport vehicle at a loading station according to one or more embodiments shown and described herein.

Referring to FIG. 4, in some embodiments, the system controller 70 may further include a loading arm sensor 250. The loading arm sensor 250 may be mounted on the hose connector assembly 35 or the hose adaptor 133 and provides a loading arm signal to the PGI controller 125 and/or system controller 70 to determine when the loading arm 200, is fluidly coupled to the hose connector assembly 35 or hose adaptor 133. If the loading arm sensor 250 indicates that the loading arm 200 is not coupled to an hose connector assembly 35, the PGI controller 125 indicates on the PGI display 140 and/or the display 80 that the delivery hose 55 is not coupled to any of the storage compartments of the product transport vehicle 15 and the system controller 70 maintains the valve in the normally locked state to prevent a spill.

The operation of the crossover protection system 10 during loading and unloading of the product transport vehicle will now be described in more detail with specific reference to the Figures.

Referring now to FIG. 4, a product transport vehicle 15 is schematically depicted at a loading station. In some embodiments, the product transport vehicle 15 may arrive at the loading station completely empty. In the "empty" state, the PGI controller 125 and/or the system controller 70 may have the loaded liquid type in a particular tank compartment set either by the operator using the plurality of input devices 145 or by the FPS 130 indicating a "dry" sensor condition or the pressure sensor 135 indicating the amount of liquid product is zero or near zero. In the later cases, the loaded liquid type may be set to "empty" when there is no liquid product in a particular tank compartment In some other embodiments, the product transport vehicle 15 may arrive at the loading station with at least one of the plurality of tank compartments 25 empty, as for example if the product transport vehicle 15 just returned from a product delivery run. The PGI controller 125 associated with that tank compartment 25 will indicate the last status from the product delivery run. For example, if the tank compartment 25 is empty, the PGI display 140 may indicate "empty" automatically based on readings from either the pressure sensor 135 or FPS 130 and without input from the operator. Otherwise, the PGI display 140 will display an error code alternating message between "Prior Product Grade", "Retained Product", and "Frustrated Load" to indicate the tank compartment 25 is not empty from the product delivery run. The error code messages are related and may only scroll due to the limitations of the PGI display 140. The "Prior Product Grade" message indicates what product was in the tank compartment 25. The "Retained Product" message indicates that there is product left in the tank compartment 25, and the "Frustrated Load" message indicates that not all of the product was delivered to the distribution tank 65. To alert the operator to make a selection before filling the tank compartments 25, an alerting device associated with the PGI controller may be used. Examples of suitable alerting devices include, without limitation, an audible alert produced by an audio device 160, a flashing message or color from the PGI display 140, and/or a visual device, such as one or more LEDs (not shown). The alerting device may be associated with a specific PGI controller 125 allowing the operator to easily locate which PGI controller 125 needs attention. If the PGI controller 125 is not used on the product transport vehicle 15, the system controller 70 may indicate the status of individual tank compartments 25 of the plurality of tank compartments using the above convention, the display 80, and an alerting device associated with the system controller 70.

Referring to FIGS. 2, 3A, 3B, and 4, to load liquid product into the tank compartment 25, a loading arm coupler 200 is connected to the hose adaptor 133 of the hose adaptor assembly 35 to fill the corresponding tank compartment 25. The loading arm coupler 200 is fluidly coupled to a storage tank (not shown) of the loading station. In one embodiment, the PGI controller 125 may not allow the operator to load the liquid product into one or more of the tank compartments 25 until the loaded liquid type is selected as discussed above. The PGI controller 125 may receive a valve open air signal from an air selector valve panel (not shown) indicating the operator has tried to open an individual valve of the plurality of valves. The PGI controller 125 and/or the system controller 70 may display an error message and instruct the operator that the loaded liquid type is not selected or that a mismatch of liquid types may occur between the liquid product the operator wishes to load and a current transported liquid type already present in the tank compartment 25. The PGI controller 125 and/or system controller may maintain the corresponding valve in the normally locked state until the PGI controller 125 and/or the system controller 70 indicate that the loaded liquid type has been entered and/or the loaded liquid type and the transported liquid type are the same. Once the loaded liquid type is accepted by the PGI controller 125 and/or system controller 70, the PGI controller and/or system controller 70 may enable the corresponding valve to transition from the normally locked state to the unlocked state and the operator may then manually transition the valve to open and fill the tank compartment 25 with the liquid product.

In embodiments, the PGI controller 125 and/or the system controller 70 may be communicatively coupled to the braking system of the product transport vehicle 15, either pneumatically or electrically, as described above. In these embodiments, the system controller 70 may require a brake signal to indicate that the parking brake on the product transport vehicle 15 is released before loading or unloading of the liquid product may be allowed to proceed. The PGI controller 125 and/or the system controller 70 may be coupled to the parking brake sensor 79 which provides the brake signal. The brake signal is indicative of whether the brake is engaged or released. In other embodiments, the system controller 70 may use multiple indicators to determine the product transport vehicle's current mode of operation (i.e. loading or unloading product). These indicators may include, for example, the brake signal, the FPS sensor signals, and the pressure sensor signals. In a similar manner, the system controller 70 may utilize the accelerometer signal from the accelerometer 78 to determine if the product transport vehicle 15 is moving before allowing any of the plurality of valves to transition from the normally locked state to the unlocked state and allow product loading/unloading to occur. For example, if the accelerometer 78 indicates that the product transport vehicle is moving, the system controller 70 may prevent the emergency valve 40 and/or the control valve 45 from being transitioned from the normally locked state to the unlocked state. Likewise, once the accelerometer 78 indicates that the transport vehicle has begun moving, the PGI controller 125 and/or the system controller 70 may transition the valve from the unlocked state to the normally locked state to cease any loading or unloading of product from or to the tank compartment 25 and indicate that the current operating mode has concluded.

In one embodiment, as the tank compartment 25 is filled, the FPS 130 senses or determines the transported liquid type of the liquid product. The identity of the liquid product in the tank compartment 25 sensed by the FPS 130 may be indicative of at least one of a density, a viscosity, a dielectric constant, a temperature, or combinations thereof. The PGI controller 125 and/or the system controller 70 reads or polls the FPS 130 to receive the transported fluid property signal indicative of the transported liquid type of the liquid product. Based on the transported fluid property signal received from the FPS 130, the system controller 70 determines the identity of the liquid product in the tank compartment. In one embodiment, the system controller 70 may determine the identity of the liquid product in the tank compartment 25 by comparing the transported fluid property signal transmitted or read from the FPS 130 to a database or look up table (LUT) of transported liquid type signals stored in a computer readable medium and indexed according to liquid product type, as described above. In some embodiments, the identity of the liquid product is stored in the computer-readable medium of the PGI controller and/or the system controller 70 and indexed according to the associated tank compartment 25 such that the contents of each tank compartment are recorded in the computer-readable medium. In some other embodiments, the FPS 130 is utilized to continuously monitor and determine the type of liquid stored in the tank compartment 25 and continuously or periodically provide the system controller 70 with a transported fluid property signal indicative of the transported liquid type.

If, for example, the system controller 70 determines that the transported liquid type from the FPS 130 does not match the loaded liquid type indicated by the operator through the PGI controller 125, the system controller 70 and/or the PGI controller 125 will either maintain the valve in the normally locked state or transition the valve from the unlocked state to the normally locked state, thereby closing the valve and stopping the flow of liquid product into the tank compartment 25. The operator may override the system controller 70 to manually transition the valve from the normally locked state to the unlocked state and continue filling the tank compartment 25.

In another embodiment, the system controller 70 or the PGI controller 125 may mimic an error indicator of an existing control system on the product transport vehicle 15 to stop the flow of liquid product into the tank compartment 25 when the system controller 70 determines that the transported liquid type from the FPS 130 does not matches the loaded liquid type indicated by the operator. For example, the system controller 70 or the PGI controller 125 may stop the flow of liquid product from the storage tank to the tank compartment 25 by mimicking an overfill condition in the tank compartment to the onboard overfill detection system (not shown). The overfill condition may be communicated to the onboard overfill detection system coupled to the tank compartment 25 via an overfill condition signal. The onboard overfill detection system monitors for an overfill condition in the individual tank compartments 25 of the product transport vehicle 15 using a point level sensor (not shown). The point level sensor may be positioned in the tank compartment and transmit a point signal to the system controller 70 to indicate whether there is an overfill condition of liquid product within the tank compartment 25.

The onboard overfill detection system on the product transport vehicle 15 is communicatively coupled to a loading station control system (not shown) in the loading station. The loading station control system controls the flow of liquid product from the storage tanks. When the system controller 70 or the PGI controller 125 determines that the transported liquid type from the FPS 130 does not match the loaded liquid type indicated by the operator, the overfill condition signal may be transmitted to the onboard overfill detection system. The onboard overfill detection system will instruct the loading station control system to cease loading liquid product onto the tank compartment 25 on the product transport vehicle.

In another embodiment, the system controller 70 and/or PGI controller 125 may receive a valve open signal indicating the operator has opened the emergency valve 40 and/or the control valve 45 to allow the loading of liquid product into the tank compartment 25. The PGI controller 125 and/or the system controller 70 may then start to poll the FPS 130 to sense or determine the transported liquid type of the liquid product. The PGI controller 125 and/or the system controller 70 may determine the transported liquid type by comparing the transported liquid type signal read or transmitted from the FPS 130 to a database or look up table (LUT) of signals stored in a computer readable medium and indexed according to liquid product type. The identity of the liquid product is stored in the computer-readable medium of the PGI controller and/or the system controller 70 and indexed according to the associated tank compartment 25 such that the contents of each tank are recorded in a computer-readable medium.

Where the liquid product is a petroleum product, the PGI controller 125 and/or system controller 70 determine whether the liquid product in the tank compartment 25 is a distillate or gasoline liquid product. When the liquid product is gasoline, the PGI controller and/or system controller may alert the operator to enter in the product grade (i.e., the octane rating) of the gasoline that has been loaded into the tank compartment 25 by flashing "Set Grade" on the PGI display. In this embodiment, the operator may select from a variety of pre-programmed options to set the grade of the liquid product being loaded. The PGI controller 125 electrically communicates a signal encoding the selection to the system controller 70. The system controller 70 stores, in a computer readable medium, the liquid product type information for the tank compartment 25 holding the liquid product. The process is repeated as other tank compartments 25 are filled in the product transport vehicle 15 with either the same liquid product or a different liquid product.

Still referring to FIG. 4, in one embodiment, the loading arm 200 may include a loading arm tag 205 having the loaded liquid type encoded therein. The adaptor tag reader 85 may interrogate the loading arm tag 205 and transmit a first signal encoding a loaded liquid type to the system controller 70. The loaded liquid type information is received by the wireless module and recorded to a computer readable medium of the system controller 70. The loaded liquid type information is correlated to the tank compartment 25 that the liquid product is being loaded into. As the liquid product is being loaded into the tank compartment 25, the FPS 130 senses the transported liquid type and communicates a transported liquid type signal to the system controller 70, as described above. Once the system controller 70 has determined the identity of the liquid product being loaded, the system controller 70 may either send a signal to the PGI controller 125 indicative of the transported liquid type as determined with the FPS 130 for indication on the PGI display 140 and/or make the determination of the transported liquid type matches the loaded liquid type. In this embodiment, the loaded liquid type may either be derived from the loading arm tag 205 or from operator input into the PGI controller 125. For example, when the liquid product is a liquid petroleum product, the PGI display 140 may display either "Distillate Detected" or "Gasoline Detected.".

Where gasoline is detected, the PGI controller 125 may prompt the user to "Set Grade", as noted above. In this embodiment, the operator may select from a variety of pre-programmed options to set the grade of the liquid product being loaded. The PGI controller 125 then communicates a grade signal encoding a grade selection to the system controller 70. The system controller 70 compares the grade selection to the loading arm tag 205 loaded liquid type to confirm a match. The system controller 70 stores, in a computer readable medium, the transported liquid type for the tank compartment 25 holding the liquid product based on either the loaded liquid type or the transported liquid type sensed by the FPS 130. The process is repeated as other tank compartments 25 are filled in the product transport vehicle 15 with either the same liquid product or a different liquid product.

If the liquid product information from the tags does not match the transported liquid type indicated by the FPS 130 or does not match the loaded liquid type from the operator's input, the system controller 70 may disable the transition of the valve from the normally locked state to the unlocked state to prevent the flow of liquid product into the tank compartment 25. The PGI controller 125 may also indicate an error on the PGI display 140 when a match is not made to warn the operator or the system controller 70 may indicate the error on the display 80. The indication may be an audible signal, visual display, etc. as described below. In embodiments, the operator may override the system controller 70 to enable the transition of the valve from the normally locked state to the unlocked state and continue filling the tank compartment 25.

FIG. 5 schematically depicts the product transport vehicle 15 at a distribution facility unloading liquid product into a first distribution tank 65a and a second distribution tank 65b from a first tank compartment 25a and a second tank compartment 25b, respectively. The operator initially chooses which tank compartment (e.g. the first tank compartment 25a or the second tank compartment 25b) from which the first distribution tank 65a and the second distribution tank 65b will be filled. If the first tank compartment 25a is chosen to fill the first distribution tank 65a, the operator may fluidly couple a first delivery hose 55a to a first hose adaptor 133a corresponding to the first tank compartment 25a. The operator then fluidly couples a first tank delivery connector 60a to the first delivery hose 55a and fluidly couples the first tank delivery connector 60a to the first distribution tank 65a. The operator may repeat similar steps to fill the second distribution tank 65b from the second tank compartment 25b with either the same liquid product type or a different liquid product type.

In some embodiments, the system controller 70 may confirm that each delivery hose is properly connected to the distribution tank and a tank compartment, as described hereinabove. In these embodiments, the system controller 70 prevents the discharge or unloading of product from any tank compartment until at least one connection is confirmed. This is accomplished by maintaining all the valves coupled to the tank compartments in a normally locked state until the connections are confirmed.

The first tank compartment 25a is now fluidly connected to the first hose adaptor 133a, the first delivery hose 55a, the first tank delivery connector 60a, and the first distribution tank 65a. Similarly, the second tank compartment 25b is now fluidly connected to the second hose adaptor 133b, the second delivery hose 55b, the second tank delivery connector 60b, and the second distribution tank 65b. The system controller 70 then confirms that the fluid connections will not cross-contaminate the liquid products stored in the respective distribution tanks.

In one embodiment, the process of product verification begins when the tank delivery connectors 60a, 60b are locked on to the corresponding distribution tank. For example, in one embodiment, the tank delivery connectors 60a, 60b may include a locking lever and a lock sensor, as described above, and power to the tank tag reader 95 is only be provided when the locking lever is in the locked position. Once the first locking lever 710a is in the locked position, the first tank tag reader 95a interrogates a first tank tag 110a to retrieve the liquid product type, and other information encoded on the first tank tag 110a. Alternatively, the operator may manually actuate a switch on the first tank delivery connector 60a to manually wake-up a first tank tag reader 95a. Once the first tank tag reader 95a is powered on, the first tank tag reader 95a interrogates the first tank tag 110 and transmits a stored liquid type signal indicative of the stored liquid type to the system controller 70. The first tank tag reader 95a may use a first tank connector antenna 115a to transmit the stored liquid type signal to the system controller 70.

The system controller 70 may be configured to communicated with a limited number of tank tag readers. For example, the first tank tag reader 95a and the second tank tag reader 95b may be registered with the system controller 70. The registration of one or more tank tag readers to the system controller may eliminate any cross-talk with other tank tag readers from other product delivery trucks at the same distribution station.

The system controller 70 receives the stored liquid product type signal from the first tank delivery connector 60a and stores it in the computer-readable medium. The system controller 70 may then compare the stored liquid type to the transported liquid type contained in any of the tank compartments of the product transport vehicle to determine if a match is present. If the system controller 70 determines that any tank compartment contains a transported liquid type matching that of the stored liquid type, the system controller 70 transitions the corresponding valve of that tank compartment from the normally locked state to the unlocked state, thereby allowing liquid product to be released from the corresponding tank compartment. However, if the system controller 70 determines that a tank compartment does not contain a transported liquid type matching that of the stored liquid type, the system controller 70 maintains the corresponding valve of that tank compartment in the normally locked state, thereby preventing the release of liquid product from the tank compartment.

Once the system controller 70 has determined that at least one tank compartment contains a transported liquid type that matches the stored liquid type and transitioned the corresponding valve to an unlocked state, the operator may operate the air selector valve for that tank compartment (in this example, the first tank compartment 25a) from an air selector valve panel (not shown) to manually (e.g. physically) open the valve and allow the flow of the liquid product from the first tank compartment 25a.

In some embodiments, the system controller 70 may require the first PGI controller 125a and/or the system controller 70 to receive a valve open air signal from an air selector valve panel (not shown) indicating the operator has opened the valve to release the product from the first tank compartment 25a. In this embodiment, the system controller 70 may prevent any other valves corresponding to any other tank compartments from being opened until the valve from the first tank compartment 25a has been physically closed after being opened (although it should be understood that the valve may remain in either the unlocked state or be transitioned to the normally unlocked state). Once the valve corresponding to the first tank compartment 25a has been physically closed, the system controller 70 may allow the operator to repeat similar steps to fill the second distribution tank 65b from the second tank compartment 25b with either the same liquid product type or a different liquid product type.

In some embodiments, if the system controller 70 detects a liquid product mismatch during one or more of the above connection sequences, it may provide the operator with a visual and/or audible warning. For example, in some embodiments the system controller 70 may instruct the first PGI controller 125a or the second PGI controller 125b to display a warning to the operator. In some embodiments, the first PGI controller 125a and/or the second PGI controller 125b may provide an audible alert produced by an alerting device, a flashing message or color from the PGI display, and/or a visual device, such as one or more LEDs, to notify the operator of the liquid product mismatch. In another embodiment, the system controller 70 may alert the operator if a mismatch is determined. The system controller 70 may alert the operator via the display 80, an audible alert produced by an alerting device, a flashing message or color from the display 80, and/or a visual device, such as one or more LEDs, to notify the operator of the liquid product mismatch.

Referring to FIGS. 1, 2, and 5, in one embodiment, the FPS 130 may be positioned in the pipe connection 50, as described above. When, the pipe connection 50 is dry, such as when there is no liquid in either the pipe connection 50 or the corresponding tank compartment 25 after the tank compartment 25 was initially loaded through the manlid 30 the FPS 130 may transmit, or alternately the system controller 70 may read, a pipe condition signal indicative of a pipe condition (i.e., the FPS 130 is unable to determine the status and/or type of the liquid). Upon receipt of this signal, the PGI controller 125 and/or the system controller 70 indicates on the PGI display 140, or alternately the display 80, that the FPS 130 is not able to determine the transported liquid type in the tank compartment 25. For example, the fluid product type matching process may be initiated by waking-up the first tank tag reader 95a, as described above. The first tank tag reader 95a interrogates the first tank tag 110a to retrieve the stored liquid type indicative of the liquid product in the first distribution tank 65a and transmits the stored liquid type signal encoding the stored liquid type to the system controller 70. The system controller 70 then transitions the valves corresponding to each tank compartment to the unlocked state from the normally locked state. This condition allows the operator system controller to flood the pipe connection 50 with liquid product from the first tank compartment 25a by opening the emergency valve 40. The FPS 130 associated with the now flooded pipe connection 50 corresponding to the first tank compartment 25a determines the transported liquid type of the liquid product in each of the tank compartments and sends transported liquid type signals for each of the compartments to the system controller 70. Once the system controller 70 has determined the transported liquid type of each tank compartment, the system controller 70 compares the transported liquid type to the stored liquid type in each of the distribution tanks 65a. For each tank compartment which contains a transported liquid type which matches the stored liquid type, the system controller transitions the control valve corresponding to each compartment with the matching transported liquid type from a normally locked state to an unlocked state to allow the unloading of the liquid product from the compartment by the operator. For those tank compartments in which the transported liquid type and the stored liquid type do not match, the system controller 70 will maintain the corresponding control valve in the normally locked state to ensure that the liquid product from tank compartment is not unloaded and may also alert the operator to the mismatch.

In embodiments where the FPS 130 is positioned in the tank compartment, this procedure to flood the pipe connection 50 may not be needed.

As indicated above, in some embodiments the system controller 70 transitions the valves corresponding to each tank compartment from the normally locked state to the unlocked state by the operator when the tank compartment is determined to contain a transported liquid type which matches the stored liquid type in a distribution tank. The transition from the normally locked state to the unlocked state allows the operator to then control the unloading of the liquid product manually by opening or closing an air selector valve on an air selector valve panel. The air selector valve panel may be utilized to physically open or close a valve corresponding to a tank compartment which contains transported liquid product matching the stored liquid type of a distribution tank. In other words, liquid product from a particular tank compartment may not be unloaded from the tank compartment 25 if the system controller 70 has not transitioned a corresponding valve from a normally locked state to an unlocked state and the operator physically opens the valve utilizing the air selector.

Referring to FIGS. 1, 2, and 3A, if the FPS 130 indicates a dry status (i.e., there is no liquid product in the tank compartment 25), the PGI controller 125 will display an "empty" status. If the FPS 130 indicates a wet status, the accelerometer indicates the product transport vehicle 15 is in motion, and/or the parking brake is released, the PGI controller 125 may display a warning. For example, in one embodiment, the PGI controller 125 may display "Prior Product Grade" and "Retained Product" and "Frustrated Load" in alternating messages and prevent the valve of the plurality of valves corresponding to the tank compartment 25 from being opened and the product unloading and/or loading process from proceeding when the product transport vehicle is in motion and/or the parking brake is released.

The system controller 70 may display an "unloading" status in the display 80 as the liquid product is being unloaded from the tank compartment 25 into the distribution tank 65. The FPS 130 may monitor the liquid product and transmit to the system controller 70 a wet status or a dry status. The system controller 70 may use the wet status and the dry status to update the computer-readable medium with information on whether any liquid product remains in the tank compartment 25 after unloading is complete.

Figure 9:
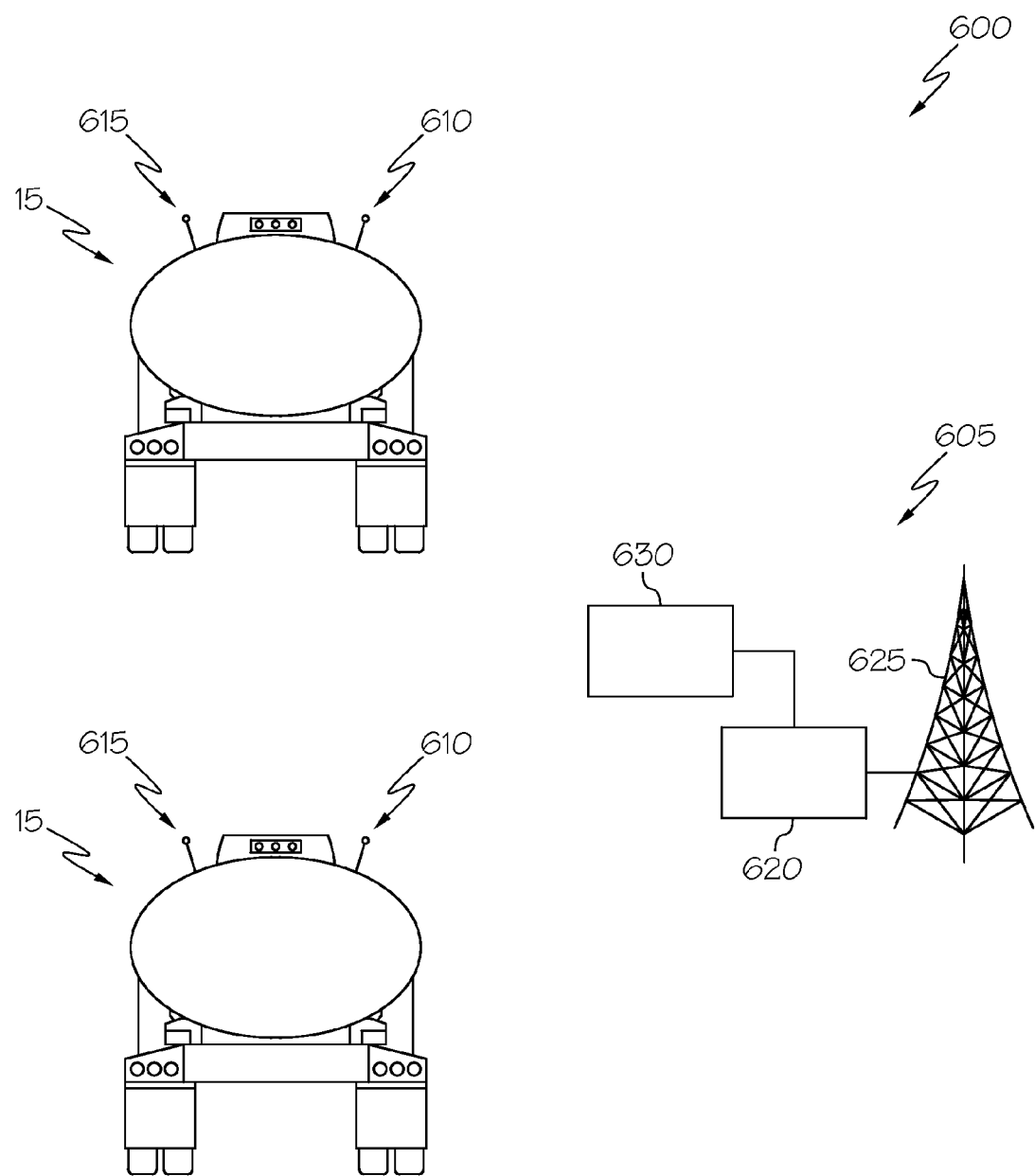
FIG. 9 schematically depicts a fleet management system according to one or more embodiments shown and described herein.

Referring now to FIG. 9, a fleet management system 600 is shown. The fleet management system 600 manages individual product transport vehicles 15 of a plurality of product transport vehicles as they travel about a geographic region. The size of the geographic region may depend on the ability of the individual product transport vehicles 15 to communicate with a base station 605. For example, a radio communication system may only provide a geographic region of about 50 miles, whereas a cellular communication system may have a geographic region that is nationwide. Further, a satellite communication system may allow for a geographic region that is worldwide.

Referring not to FIGS. 1 and 9, to communicate with the base station 605, the individual product transport vehicles 15 of the plurality of product transport vehicles may include a global position system (GPS) antenna 610 and a transmitter antenna 615 communicatively coupled to the system controller 70. The system controller 70 receives from the GPS antenna a location signal indicative of a current location of the individual product transport vehicles 15 of the plurality of product transport vehicles. The transmitter antenna 615 may be a radio antenna, a cellular antenna, a satellite antenna or any antenna that matches the communication protocol (radio, cellular, satellite, etc.) of the communication system between the individual product transport vehicles 15 of the plurality of product transport vehicles and the base station 605.

The system controller 70 may transmit, using the transmitter antenna 615, an ID signal indicative of the current location and a product transport vehicle ID to the base station 605 at regular intervals to allow a fleet system controller 620 to receive the ID signal and track the current location and product transport vehicle ID of the individual product transport vehicles 15 of the plurality of product transport vehicles. In another embodiment, the system controller 70 may transmit the ID signal only when the individual product transport vehicles 15 of the plurality of product transport vehicles is at a distribution station and/or unloading a tank compartment 25.

The base station 605 may include a receiver antenna 625 coupled to the base station 605 and communicatively coupled to the transmitter antenna 615 on the individual product transport vehicles 15 of the plurality of product transport vehicles. The fleet system controller 620 may be communicatively coupled to the receiver antenna 625 and a fleet display 630. The fleet system controller 620 may include a processor and a storage medium containing computer readable and executable instructions which, when executed by the processor, cause the fleet system controller 620 to automatically: receive the current location of the individual product transport vehicles 15 of the plurality of product transport vehicles; receive the vehicle identification; and record the current location and the vehicle identification on the storage medium.

Still referring to FIGS. 1 and 9, the system controller 70 may have a look-up table of stored locations of a plurality distribution tank 65 locations, the individual distribution tank locations indicated by GPS coordinates. The look-up table may also include the proper stored liquid type of the distribution tanks 65 at each stored location. In another embodiment, the system controller 70 may receive a stored location signal indicative of the stored location of the distribution tank 65. The stored location signal may originate with the base station 605 and be in response to receiving the ID signal with the individual product transport vehicles 15 current location. In both embodiments described above, the stored location may include the GPS coordinates of the distribution tank 65, a location liquid type indicative of the liquid product within the distribution tank 65, and other identifiable information, such as for example, the mailing address of the distribution station in which the distribution tank 65 is located, contact information for the responsible party for the distribution tank 65, emergency contact information, and the like. The information indicated by the stored location may be displayed on the display 80 or the PGI display 140 (FIG. 3A) for the operator's use.

The system controller 70 may compare the current location indicated by the location signal from the GPS antenna 610 to the stored location GPS coordinates to determine which distribution tanks 65 are at the current location. From that determination, the system controller 70 may compare the location liquid type to either the stored liquid type transmitted by the tank tag reader 95 or the transported liquid type indicated by the FPS 130. From either of those comparisons, if they match, the system controller may either enable the transition of the valve of the plurality of valves corresponding to the tank compartment 25 to allow the unloading of the liquid product from the tank compartment 25 by the operator or transition the valve of the plurality of valves corresponding to the tank compartment 25 to the unlocked state from the normally locked state. If, either of those comparisons indicates a mis-match, the system controller 70 may disable the valve of the plurality of valves corresponding to the tank compartment 25 from transitioning from the normally locked state to the unlocked state.

The outcome of the comparisons described above between the stored liquid type (either from the tank tag or operator input), location liquid type, and the transported liquid type, may be transmitted to the base station 605 to be recorded on the computer readable medium by the fleet system controller 620. Specifically, the system controller 70 may transmit, using the transmitter antenna 615, a lock data signal indicative of lock data. The lock data may include the comparison results, the current state of individual valves of the plurality of valves, whether liquid product is or was unloaded, the amount of liquid product in each tank compartment 25, and whether the operator has override the system controller 70.

The location of the system controller 70 as shown in the FIGS. 1, 2, 4, 5, and 9 are for illustration purposes only and may be mounted in any location on the product transport vehicle 15. Furthermore, the product transport vehicle 15 may have more than one transportation tank and the product transport vehicle 15 may be a fuel truck, an aircraft, or a ship and/or boat.

The crossover protection system 10 provides an automatic check and/or intervention to prevent the mixing of dissimilar products at a distribution station 60. The crossover protection system 10 uses the FPS 130 to positively identify the product make a determination if the products match before allowing the products to mix in the distribution tank 65. Accordingly, human interaction or intervention to identify the product is not required.

The present disclosure may be embodied in hardware and/or in software (including firmware, resident software, micro-code, etc.). The system controller 70 may have at least one processor and the computer-readable medium. A computer-usable or the computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A crossover protection system, comprising:
   a product transport vehicle comprising a tank compartment for containing a liquid product;
   a valve coupled to the tank compartment, the valve regulating a flow of liquid product from the tank compartment and having a normally locked state;
   a fluid property sensor positioned to contact the liquid product stored in the tank compartment;
   a tank delivery connector fluidly coupled to a distribution side of the valve, the tank delivery connector comprising:
      a tank tag reader for interrogating a tank tag coupled to a distribution tank separate from the product transport vehicle;
      a lock mechanism coupled to the tank delivery connector, the lock mechanism comprising a locking lever with a locked position and an unlocked position, the lock mechanism mechanically securing the tank delivery connector to the distribution tank when the locking lever is in the locked position; and
      a lock sensor for sensing whether the locking lever is in the locked position or the unlocked position, wherein when the locking lever is in the locked position as indicated by the lock sensor:
         the tank tag reader interrogates the tank tag to retrieve a stored liquid type encoded on the tank tag, wherein the stored liquid type is indicative of a type of the liquid product in the distribution tank; and
         the tank delivery connector transmits a stored liquid type signal indicative of the stored liquid type; and
   a system controller communicatively coupled to the valve, the fluid property sensor, and the tank delivery connector, the system controller comprising a processor and a storage medium containing computer readable and executable instructions which, when executed by the processor, cause the system controller to automatically:
      receive a transported fluid property signal from the fluid property sensor, the transported fluid property signal being indicative of at least one of a viscosity, density, dielectric constant, and temperature of the liquid product in the tank compartment;
      determine a transported liquid type of the liquid product in the tank compartment based on the transported fluid property signal;
      receive the stored liquid type signal;
      determine the stored liquid type based on the stored liquid type signal;
      compare the transported liquid type to the stored liquid type;
      maintain the valve in the normally locked state when the stored liquid type and the transported liquid type do not match to prevent the flow of liquid product from the tank compartment; and
      transition the valve from the normally locked state to an unlocked state when the stored liquid type and the transported liquid type match, thereby permitting the flow of liquid product from the tank compartment.

2. The crossover protection system of claim 1, wherein the valve is an emergency valve.

3. The crossover protection system of claim 1, wherein the valve is a control valve.

4. The crossover protection system of claim 1, further comprising a display electrically coupled to the system controller, wherein the computer readable and executable instructions, when executed by the processor, further cause the system controller to indicate on the display at least one of the stored liquid type of the distribution tank and the transported liquid type of the liquid product in the tank compartment.

5. The crossover protection system of claim 1, further comprising a delivery hose fluidly coupled to the distribution tank, wherein the tank delivery connector is fluidly coupled to the delivery hose and fluidly coupled to the distribution tank.

6. The crossover protection system of claim 1, wherein the lock sensor is mechanically coupled to the lock mechanism and electrically coupled to the tank tag reader, wherein the lock sensor provides a delivery connector locked signal when the locking lever is in the locked position and the tank delivery connector transmits the delivery connector locked signal to the system controller when the tank delivery connector is secured to the distribution tank.

7. The crossover protection system of claim 6, wherein the computer readable and executable instructions, when executed by the processor, further cause the system controller to:
   receive the delivery connector locked signal, and
   enable the valve to transition from the normally locked state to the unlocked state.

8. The crossover protection system of claim 1, wherein power to the tank tag reader is only provided when the locking lever is in the locked position.

9. The crossover protection system of claim 1, wherein the tank tag reader further transmits a tank delivery connector ID signal to the system controller, the tank delivery connector ID signal indicating an identity of the tank delivery connector, wherein the computer readable and executable instructions, when executed by the processor, further cause the system controller to pair the system controller with the tank delivery connector having the identity.

10. The crossover protection system of claim 1, further comprising:
    a delivery hose fluidly coupling the tank compartment to the tank delivery connector, the delivery hose comprising a lock tag at a lock end of the delivery hose and a connector hose tag at a connector end of the delivery hose, wherein the lock tag and the connector hose tag are encoded with a first hose ID;
    an adaptor tag reader communicatively coupled to the system controller and positioned on a hose adaptor coupled to the tank compartment, the adaptor tag reader interrogating the lock tag of the delivery hose at the lock end and sending an adaptor signal indicative of the first hose ID to the system controller when the delivery hose is coupled to the hose adaptor;
    a hose tag reader communicatively coupled to the system controller and positioned on the tank delivery connector, the hose tag reader interrogating the connector hose tag at the connector end of the delivery hose and sending a hose signal indicative of the first hose ID to the system controller when the delivery hose is coupled to the tank delivery connector, wherein the processor of the system controller executes the computer readable and executable instructions to further:
       receive the hose signal indicative of the first hose ID from the hose tag reader;

receive the adaptor signal indicative of the first hose ID from the adaptor tag reader;

enable the valve to transition from the normally locked state to the unlocked state when both the hose signal and the adaptor signal are received; and maintain the valve in the normally locked state when at least one of the hose signal and the adaptor signal are not received.

11. The crossover protection system of claim 1, wherein the fluid property sensor is a tuning fork sensor.

12. The crossover protection system of claim 1, further comprising a product grade indicator (PGI) controller communicatively coupled to the system controller, the PGI controller comprising an input device for inputting a loaded liquid type into the PGI controller.

13. The crossover protection system of claim 12, wherein the PGI controller further comprises a display indicating the loaded liquid type and the transported liquid type in the tank compartment.

14. The crossover protection system of claim 12, wherein the computer readable and executable instructions, when executed by the processor, further cause the system controller to prevent the flow of loaded liquid product into the tank compartment with the valve when the loaded liquid type and the transported liquid type do not match.

15. The crossover protection system of claim 12, wherein the computer readable and executable instructions, when executed by the processor, further cause the system controller to allow the flow of loaded liquid product into the tank compartment with the valve when the loaded liquid type and the transported liquid type match.

16. The crossover protection system of claim 12, further comprising an overfill detection system communicatively coupled to the system controller, wherein the computer readable and executable instructions, when executed by the processor, further cause the system controller to transmit an overfill condition to the overfill detection system, wherein the overfill detection system stops the flow of loaded liquid product from a liquid product loading station into the tank compartment when the loaded liquid type and the transported liquid type do not match.

17. The crossover protection system of claim 1, further comprising a pressure sensor positioned in the tank compartment, the pressure sensor transmitting a pressure signal to the system controller indicating an amount of liquid product present in the tank compartment.

18. The crossover protection system of claim 1, further comprising a point level sensor positioned in the tank compartment, the point level sensor transmitting a point signal to the system controller indicating whether there is an overfill condition of liquid product within the tank compartment.

19. A crossover protection system for a product transportation vehicle with multiple tank compartments, the system comprising:

a product transport vehicle comprising a plurality of tank compartments for containing liquid product;

a plurality of valves, individual ones of the plurality of valves being coupled to individual ones of the plurality of tank compartments and regulating a flow of liquid product from the individual ones of the plurality of tank compartments and having a normally locked state;

a plurality of fluid property sensors, individual ones of the plurality of fluid property sensors being positioned to contact the liquid product stored in individual ones of the plurality of tank compartments;

a tank delivery connector fluidly coupled to one of the plurality of valves, the tank delivery connector comprising:

a tank tag reader for interrogating a tank tag coupled to a distribution tank separate from the product transport vehicle;

a lock mechanism coupled to the tank delivery connector, the lock mechanism comprising a locking lever with a locked position and an unlocked position, the lock mechanism mechanically securing the tank delivery connector to the distribution tank when the locking lever is in the locked position; and a lock sensor for sensing whether the locking lever is in the locked position or the unlocked position, wherein when the locking lever is in the locked position as indicated by the lock sensor:

the tank tag reader interrogates the tank tag to retrieve a stored liquid type encoded on the tank tag, wherein the stored liquid type is indicative of a type of the liquid product in the distribution tank; and the tank delivery connector transmits a stored liquid type signal indicative of the stored liquid type; and a system controller communicatively coupled to the plurality of valves, the plurality of fluid property sensors, and the tank delivery connector, the system controller comprising a processor and a storage medium containing computer readable and executable instructions which, when executed by the processor, cause the system controller to automatically:

receive a transported fluid property signal from individual ones of the plurality of fluid property sensors, the transported fluid property signal being indicative of at least one of a viscosity, density, dielectric constant, and temperature of the liquid product in individual ones of the plurality of tank compartments;

determine a transported liquid type of the liquid product in individual ones of the plurality of tank compartments based on the transported fluid property signal;

receive the stored liquid type signal;

determine the stored liquid type based on the stored liquid type signal;

compare the transported liquid type in each of the plurality of tank compartments to the stored liquid type;

maintain individual ones of the plurality of valves in the normally locked state when the transported liquid type in the corresponding tank compartment is not the same as the stored liquid type to prevent the flow of liquid product from the corresponding tank compartment; and transition individual ones of the plurality of valves from the normally locked state to an unlocked state when the transported liquid type in the corresponding tank compartment is the same as the stored liquid type, thereby allowing the flow of liquid product from the corresponding tank compartment.

20. The crossover protection system of claim 19, wherein the plurality of valves includes an emergency valve.

21. The crossover protection system of claim 19, wherein the plurality of valves includes a control valve.

22. The crossover protection system of claim 19, further comprising a display electrically coupled to the system controller, wherein the computer readable and executable instructions, when executed by the processor, further cause the system controller to indicate on the display at least one of the stored liquid type of the distribution tank and the transported liquid type of the liquid product in the plurality of tank compartments.

23. The crossover protection system of claim 19, further comprising a delivery hose fluidly coupled to the distribution tank, wherein the tank delivery connector is fluidly coupled to the delivery hose and fluidly coupled to the distribution tank.

24. The crossover protection system of claim 19, wherein the lock sensor is mechanically coupled to the lock mechanism and electrically coupled to the tank tag reader, wherein the lock sensor provides a delivery connector locked signal when the locking lever is in the locked position and the tank delivery connector transmits the delivery connector locked signal to the system controller when the tank delivery connector is secured to the distribution tank.

25. The crossover protection system of claim 24, wherein the computer readable and executable instructions, when executed by the processor, further cause the system controller to:
receive the delivery connector locked signal, and
enable the corresponding valve of the plurality of valves to transition from the normally locked state to the unlocked state.

26. The crossover protection system of claim 19, wherein power to the tank tag reader is only provided when the locking lever is in the locked position.

27. The crossover protection system of claim 19, wherein the tank tag reader further transmits a tank delivery connector ID signal to the system controller, the tank delivery connector ID signal indicating an identity of the tank delivery connector, wherein the computer readable and executable instructions, when executed by the processor, further cause the system controller to pair the system controller with the tank delivery connector having the identity.

28. The crossover protection system of claim 19, wherein the tank delivery connector is a first tank delivery connector, the system further comprising:
a first delivery hose fluidly coupling a first tank compartment of the plurality of tank compartments to the first tank delivery connector, the first delivery hose comprising a first lock tag at a first lock end of the first delivery hose and a first connector hose tag at a first connector end of the first delivery hose, wherein the first lock tag and the first connector hose tag are encoded with a first hose ID;
a plurality of hose adaptors, a first hose adaptor of the plurality of hose adaptors being coupled to the first tank compartment;
a first adaptor tag reader communicatively coupled to the system controller and positioned on the first hose adaptor, the first adaptor tag reader interrogating the first lock tag of the first delivery hose at the first lock end and sending a first adaptor signal indicative of the first hose ID to the system controller when the first delivery hose is coupled to the first hose adaptor;
a first hose tag reader communicatively coupled to the system controller and positioned on the first tank delivery connector, the first hose tag reader interrogating the first connector hose tag at the first connector end of the first delivery hose and sending a first hose signal indicative of the first hose ID to the system controller when the first delivery hose is coupled to the first tank delivery connector, wherein the processor of the system controller executes the computer readable and executable instructions to further:
receive the first hose signal indicative of the first hose ID from the first hose tag reader;
receive the first adaptor signal indicative of the first hose ID from the first adaptor tag reader;
enable a first valve of the plurality of valves corresponding to the first delivery hose to transition from the normally locked state to the unlocked state when both the first hose signal and the first adaptor signal are received; and
maintain the first valve of the plurality of valves corresponding to the first delivery hose in the normally locked when at least one of the first hose signal and the first adaptor signal are not received.

29. The crossover protection system of claim 28, further comprising:
a second delivery hose fluidly coupling a second tank compartment of the plurality of tank compartments to a second tank delivery connector, the second delivery hose comprising a second lock tag at a second lock end of the second delivery hose and a second connector hose tag at a second connector end of the second delivery hose, wherein the second lock tag and the second connector hose tag are encoded with a second hose ID;
an second adaptor tag reader communicatively coupled to the system controller and positioned on a second hose adaptor coupled to the second tank compartment, the second adaptor tag reader interrogating the second lock tag of the second delivery hose at the second lock end and sending a second adaptor signal indicative of the second hose ID to the system controller when the second delivery hose is coupled to the second hose adaptor;
a second hose tag reader communicatively coupled to the system controller and positioned on the second tank delivery connector, the second hose tag reader interrogating the second connector hose tag at the second connector end of the second delivery hose and sending a second hose signal indicative of the second hose ID to the system controller when the second delivery hose is coupled to the second tank delivery connector, wherein the processor of the system controller executes the computer readable and executable instructions to further:
receive the second hose signal indicative of the second hose ID from the second hose tag reader;
receive the second adaptor signal indicative of the second hose ID from the second adaptor tag reader;
enable a second valve coupled to the second tank compartment to transition from the normally locked state to the unlocked state when both the second hose signal and the second adaptor signal are received; and
maintain the second valve in the normally locked state when at least one of the second hose signal and the second adaptor signal are not received.

30. The crossover protection system of claim 29, further comprising:
a first position sensor coupled to the first valve, the first position sensor transmitting a first position signal to the system controller indicating whether the first valve is open or closed; and
a second position sensor coupled to the second valve, the second position sensor transmitting a second position signal to the system controller indicating whether the second valve is open or closed.

31. The crossover protection system of claim 30, wherein the computer readable and executable instructions, when executed by the processor, further cause the system controller to receive the second hose signal and the second adaptor signal when the first position sensor indicates the first valve is open.

32. The crossover protection system of claim 19, wherein the plurality of fuel property sensors includes a tuning fork sensor.

33. The crossover protection system of claim 19, further comprising a plurality of product grade indicator (PGI) controllers, individual ones of the plurality of PGI controllers being communicatively coupled to the system controller and coupled to individual ones of the plurality of tank compartments, individual ones of the plurality of PGI controllers comprising an input device for inputting a loaded liquid type.

34. The crossover protection system of claim 33, wherein individual ones of the plurality of PGI controllers further comprises a display indicating the loaded liquid type and the transported liquid type in the corresponding tank compartment.

35. The crossover protection system of claim 33, wherein the computer readable and executable instructions, when executed by the processor, further cause the system controller to prevent the flow of loaded liquid product into individual ones of the plurality of tank compartments with the corresponding valve when the loaded liquid type and the transported liquid type do not match.

36. The crossover protection system of claim 33, wherein the computer readable and executable instructions, when executed by the processor, further cause the system controller to allow the flow of loaded liquid product into the individual ones of the plurality of tank compartments with the corresponding valve when the loaded liquid type and the transported liquid type match.

37. The crossover protection system of claim 33, further comprising an overfill detection system communicatively coupled to the system controller, wherein the computer readable and executable instructions, when executed by the processor, further cause the system controller to transmit an overfill condition to the overfill detection system, wherein the overfill detection system stops the flow of loaded liquid product from a liquid product loading station into individual ones of the plurality of tank compartments when the loaded liquid type and the transported liquid type do not match.

38. The crossover protection system of claim 19, further comprising a plurality of pressure sensors, individual ones of the plurality of pressure sensors being positioned in individual ones of the plurality of tank compartments, individual ones of the plurality of pressure sensors transmitting a pressure signal to the system controller indicating an amount of liquid product present in the corresponding tank compartment.

39. The crossover protection system of claim 19, further comprising a plurality of point level sensors, individual ones of the plurality of point level sensors being positioned in individual ones of the plurality of corresponding tank compartments, individual ones of the plurality of point level sensors transmitting a point signal to the system controller indicating whether there is an overfill condition of liquid product within the corresponding tank compartment.

40. A method for preventing the mixing of dissimilar liquid products, comprising:

coupling a tank delivery connector to a distribution side of a valve coupled to a tank compartment of a product delivery vehicle;

sensing when a lock mechanism of the tank delivery connector secures the tank delivery connector to a distribution tank with a lock sensor;

when the lock mechanism secures the tank delivery connector to the distribution tank as indicated by the lock sensor, interrogating a tank tag coupled to the distribution tank with a tank tag reader of the tank delivery connector in order to retrieve a stored liquid type encoded on the tank tag, wherein the stored liquid type is indicative of a type of liquid product stored in the distribution tank;

when the lock mechanism secures the tank delivery connector to the distribution tank as indicated by the lock sensor, transmitting to a system controller a stored liquid type signal indicative of the stored liquid type of the distribution tank;

receiving at the system controller the stored liquid type signal;

determining the stored liquid type based on the stored liquid type signal;

receiving at the system controller a transported fluid property signal from a fluid property sensor positioned to contact liquid product stored in the tank compartment, the transported fluid property signal being indicative of at least one of a viscosity, density, dielectric constant, and temperature of the liquid product in the tank compartment;

determining a transported liquid type of the liquid product in the tank compartment based on the transported fluid property signal;

comparing the transported liquid type to the stored liquid type;

maintaining the valve in a normally locked state when the stored liquid type and the transported liquid type do not match to prevent the flow of liquid product from the tank compartment; and transitioning the valve from the normally locked state to an unlocked state when the stored liquid type and the transported liquid type match, thereby permitting the flow of liquid product from the tank compartment.

41. The method of claim 40, wherein the valve is an emergency valve.

42. The method of claim 40, wherein the valve is a control valve.

43. The method of claim 40, further comprising displaying at least one of the stored liquid type of the distribution tank and the transported liquid type of the liquid product in the tank compartment on a display electrically coupled to the system controller.

44. The method of claim 40, further comprising:

fluidly coupling a delivery hose to the distribution tank such that the tank delivery connector is fluidly coupled to the delivery hose and fluidly coupled to the distribution tank.

45. The method of claim 40, further comprising:

locking the tank delivery connector to the distribution tank with the lock mechanism, wherein the lock mechanism includes a locking lever with a locked position and an unlocked position, the lock mechanism mechanically securing the tank delivery connector to the distribution tank;

and transmitting a delivery connector locked signal to the system controller when the locking lever is in the locked position and the tank delivery connector is secured to the distribution tank.

46. The method of claim 45, wherein the computer readable and executable instructions, when executed by the processor, further cause the system controller to:
receive the delivery connector locked signal, and
enable the valve to transition from the normally locked state to the unlocked state.

47. The method of claim 40, further comprising:
locking the tank delivery connector to the distribution tank with the lock mechanism such that the lock mechanism mechanically secures the tank delivery connector to the distribution tank;
actuating a switch electrically coupled to a power supply and the tank tag reader; and
transmitting the stored liquid type signal to the system controller when the switch is actuated.

48. The method of claim 40, further comprising receiving at the system controller a tank delivery ID signal indicating an identity of the tank delivery connector from the tank tag reader.

49. The method of claim 40, further comprising:
coupling the tank compartment to the tank delivery connector with a delivery hose, the delivery hose comprising a lock tag at a lock end of the delivery hose and a connector hose tag at a connector end of the delivery hose, wherein the lock tag and the connector hose tag are encoded with a first hose ID;
interrogating the lock tag of the delivery hose at the lock end with an adaptor tag reader communicatively coupled to the system controller and positioned on a hose adaptor coupled to the tank compartment;
sending an adaptor signal indicative of the first hose ID to the system controller with the adaptor tag reader;
interrogating the connector hose tag at the connector end of the delivery hose with a hose tag reader communicatively coupled to the system controller and positioned on the tank delivery connector;
sending a hose signal indicative of the first hose ID to the system controller with the hose tag reader;
receiving at the system controller the hose signal indicative of the first hose ID from the hose tag reader;
receiving at the system controller the adaptor signal indicative of the first hose ID from the adaptor tag reader;
enabling the valve to transition from the normally locked state to the unlocked state when both the hose signal and the adaptor signal are received; and
maintaining the valve in the normally locked state when at least one of the hose signal and the adaptor signal are not received.

50. The method of claim 40, wherein the fluid property sensor is a tuning fork sensor.

51. The method of claim 40, further comprising inputting a loaded liquid into a product grade indicator (PGI) controller communicatively coupled to the system controller, the PGI controller comprising an input device.

52. The method of claim 51, further comprising indicating the loaded liquid type and the transported liquid type in the tank compartment a display coupled to the PGI controller.

53. The method of claim 51, further comprising preventing the flow of loaded liquid product into the tank compartment with the valve when the loaded liquid type and the transported liquid type do not match.

54. The method of claim 51, further comprising allowing the flow of loaded liquid product into the tank compartment with the valve when the loaded liquid type and the transported liquid type match.

55. The method of claim 51, further comprising:
transmitting an overfill condition to an overfill detection system, the overfill detection system communicatively coupled to the system controller; and
stopping the flow of loaded liquid product from a liquid product loading station into the tank compartment with the overfill detection system when the loaded liquid type and the transported liquid type do not match.

56. The method of claim 40, further comprising:
sensing an amount of liquid product present in the tank compartment with a pressure sensor positioned in the tank compartment; and
transmitting a pressure signal to the system controller indicative of the sensed amount of liquid product present in the tank compartment.

57. The method of claim 40, further comprising:
sensing an overfill condition of liquid product within the tank compartment with a point level sensor positioned in the tank compartment; and
transmitting a point signal to the system controller indicating whether there is the overfill condition of liquid product within the tank compartment.

* * * * *